United States Patent
Jung et al.

(10) Patent No.: US 9,351,225 B2
(45) Date of Patent: May 24, 2016

(54) METHOD FOR SUPPORTING MOBILITY OF USER EQUIPMENT IN WIRELESS COMMUNICATION SYSTEM, AND DEVICE SUPPORTING THE SAME

(71) Applicant: LG ELECTRONICS INC., Seoul (KR)

(72) Inventors: Sung Hoon Jung, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 133 days.

(21) Appl. No.: 14/348,391

(22) PCT Filed: Oct. 9, 2012

(86) PCT No.: PCT/KR2012/008154
§ 371 (c)(1),
(2) Date: Mar. 28, 2014

(87) PCT Pub. No.: WO2013/055071
PCT Pub. Date: Apr. 18, 2013

(65) Prior Publication Data
US 2014/0228032 A1    Aug. 14, 2014

Related U.S. Application Data

(60) Provisional application No. 61/545,171, filed on Oct. 9, 2011.

(51) Int. Cl.
*H04W 36/32* (2009.01)
*H04W 8/02* (2009.01)
*H04W 36/30* (2009.01)
*H04W 36/08* (2009.01)
*H04W 48/20* (2009.01)

(52) U.S. Cl.
CPC ........... *H04W 36/32* (2013.01); *H04W 8/02* (2013.01); *H04W 36/30* (2013.01); *H04W 36/08* (2013.01); *H04W 48/20* (2013.01)

(58) Field of Classification Search
CPC ..... H04W 36/08; H04W 36/30; H04W 36/32; H04W 48/20; H04W 8/02
USPC ............ 455/436, 437, 439, 441, 443, 44
See application file for complete search history.

(56) References Cited

U.S. PATENT DOCUMENTS

| | | | |
|---|---|---|---|
| 8,855,637 B2 * | 10/2014 | Robbins | H04W 36/0094 370/338 |
| 2008/0220782 A1 | 9/2008 | Wang et al. | |
| 2009/0238117 A1 | 9/2009 | Somasundaram et al. | |
| 2011/0021201 A1 * | 1/2011 | Lee | H04W 48/20 455/444 |

FOREIGN PATENT DOCUMENTS

| | | |
|---|---|---|
| KR | 1020100050336 A | 5/2010 |
| KR | 1020110011554 A | 2/2011 |
| WO | 2011123744 A1 | 10/2011 |

* cited by examiner

*Primary Examiner* — Barry Taylor
(74) *Attorney, Agent, or Firm* — Dentons US LLP

(57) ABSTRACT

Provided is a method for supporting mobility of a user equipment in a wireless communication system. The method comprises the following steps: receiving Mobility State Estimation (MSE) control information including information for MSE from a network; executing mobility if a mobility condition is satisfied; updating a mobility counter on the basis of the MSE control information; estimating a mobility state of the user equipment on the basis of the updated mobility counter; and scaling a mobility parameter on the basis of the estimated mobility state.

10 Claims, 16 Drawing Sheets

METHOD FOR SUPPORTING MOBILITY OF USER EQUIPMENT IN WIRELESS COMMUNICATION SYSTEM, AND DEVICE SUPPORTING THE SAME

This application is a 35 USC §371 National Stage entry of International Application No. PCT/KR2012/008154, filed on Oct. 9, 2012, and claims priority of U.S. Provisional Application No. 61/545,171 filed Oct. 9, 2011 which are each hereby incorporated by reference in its entirety.

BACKGROUND OF THE INVENTION

1. Field of the Invention

The present invention relates to a wireless communication, and more particularly, to a method for supporting mobility of a user equipment in a wireless communication system and to an apparatus for supporting the same.

2. Background Art $3^{rd}$ generation partnership project (3GPP) long term evolution (LTE) which is improvement of a universal mobile telecommunications system (UMTS) is introduced as 3GPP release 8. The 3GPP LTE uses orthogonal frequency division multiple access (OFDMA) in a downlink and uses single carrier-frequency division multiple access (SC-FDMA) in an uplink. Multiple input multiple output (MIMO) having maximum four antennas are adopted. In recent years, 3GPP LTE-advanced (LTE-A) which is an evolution of the 3GPP LTE has been discussed.

The microcell, the femto cell, the pico cell, and the like, of which service area is small may be installed in a specific location of the macro cell which has wide coverage.

Since the user equipment which is represented as mobile devices moves, the quality of the mobile service currently provided may be deteriorated, or the cell that can provide a better service may be found. In this regards, the user equipment may move into a new cell and it is referred to mobility performance of the user equipment.

Since each cell has fixed coverage and the user equipment moves with a variable speed in a wireless communication system, the frequency of mobility performance of the user equipment may be changed. In order to support the mobility of the user equipment in consideration of the state of movement of the user equipment, the method of scaling a mobile state estimation (MSE) and mobility parameter have been supplied.

Meanwhile, due to the characteristics of implementation of a wireless communication system, the MSE by the user equipment may be executed without reflecting the actual state of mobility of the user equipment. That is, since the improper scaling parameter is applied in the scaling of the mobility parameter, it results in a phenomenon which the mobility performance of the user equipment is not properly executed. In order to solve such phenomenon, a method is required to support more suitably the mobility of the user equipment by controlling the MSE executed by the user equipment.

DISCLOSURE

Technical Problem

An object of the present invention is to provide a method for supporting the mobility of a user equipment in a wireless communication system and an apparatus for supporting the same.

Technical Solution

In aspect, a method for supporting mobility performance of a user equipment in a wireless communication system is provided. The method includes receiving mobility state estimation (MSE) control information including information for the MSE from a network, performing mobility if a condition for the mobility is satisfied, updating a mobility counter on the basis of the MSE control information, estimating a mobility state of the user equipment on the bases of the mobility counter updated, and scaling a mobility parameter on the basis of the mobility state estimated.

The MSE control information may include a prohibit timer value which indicates a counting threshold value to limit the value of the mobility counter and duration time in which the counting threshold value is effective. The method may further include starting up the prohibit timer which is set up as the prohibit timer value.

Updating the mobility counter may include checking whether the prohibit timer is terminated, determining whether the update of the mobility counter is performed by comparing the mobility counter and the counting threshold value if the prohibit timer is working, and increasing the mobility counter by 1, if it is determined to perform the update of the mobility counter.

Determining whether the update of the mobility counter is performed may include determining to update the mobility counter, if the value of the mobility counter is smaller than the counting threshold value.

Determining whether the update of the mobility counter is performed may include determining not to update the mobility counter, if the value of the mobility counter is same or greater than the counting threshold value.

Staring up the prohibit timer may include starting up the prohibit timer which is set up as the prohibit timer value after the working timer is terminated, if the prohibit timer which is set up as the previous prohibit timer is already in working.

In another aspect, a wireless device operating in a wireless communication system is provided. The wireless device includes a radio frequency (RF) unit to transmit or receive a wireless communication signal, and a processor functionally connected to the RF unit. The processor is configured to perform of receiving mobility station estimation (MSE) control information including information for the MSE from a network, performing mobility if the condition for the mobility is satisfied, updating a mobility counter on the basis of the MSE control information, estimating a mobility state of the user equipment on the bases of the mobility counter updated, and scaling a mobility parameter on the basis of the mobility state estimated.

Advantageous Effects

According to an exemplary embodiment of the present invention, more reinforced MSE may be provided since the MSE control information is provided to the user equipment. In the heterogeneous network where the macro cells and other small cells coexist, the improper mobility counting due to the mobility performance which is not related to the actual move of the user equipment may be prohibited. According to an exemplary embodiment of the present invention, in the wireless communication system in which inter-frequency mobility is frequently caused, the improper mobility counting due to the mobility performance which is not related to the actual move of the user equipment may be prohibited. Through this, the mobility state of the user equipment which is estimated by the MSE executed by the user equipment may more suitably reflect the actual mobility of the user equipment. On the basis of this, the user equipment may suitably execute mobility according to actual network surroundings and the state of its mobility.

MODE FOR INVENTION

Figure 1:
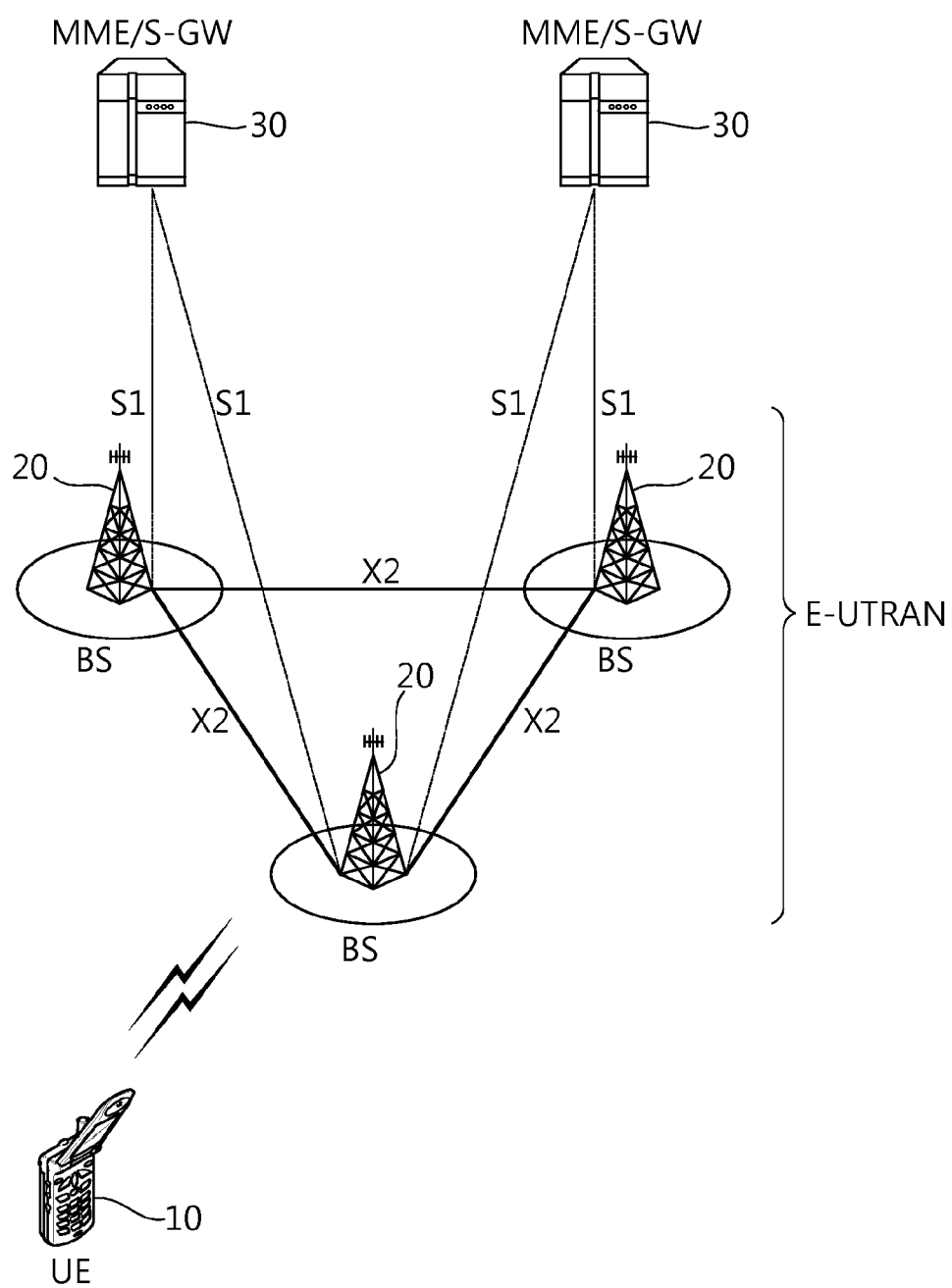
FIG. 1 illustrates a wireless communication system according to the present invention.

FIG. 1 illustrates a wireless communication system according to the present invention. The wireless communication system may also be called an evolved-UMTS terrestrial radio access network (E-UTRAN) or a long term evolution (LTE)/LTE-A system.

The E-UTRAN includes a base station (BS) 20 that provides a control plane and a user plane to a user equipment (UE) 10. The UE 10 may be fixed or movable and may be called other terms such as a mobile station (MS), a user terminal (UT), a subscriber station (SS), a mobile terminal (MT), a wireless device, and the like. The base station 20 represents a fixed station that communicates with the UE 10, and may be called other terms such as an evolved-NodeB (eNB), a base transceiver system (BTS), an access point, and the like.

The base stations 20 may be connected to each other through an X2 interface. The base station 20 is connected with an evolved packet core (EPC) 30 through an S1 interface, in more detail, a mobility management entity (MME) through an S1 MME and a serving gateway (S-GW) through an SI-U.

The EPC 30 is constituted the MME, the S-GW, and a packet data network gateway (P-GW). The MME has access information of the UE or information on a capability of the UE, and the information is primarily used for mobility management of the UE. The S-GW is a gateway having the E-UTRAN as an end point and the P-GW is a gateway having a PDN as the end point.

Layers of a radio interface protocol between the UE and a network may be divided into an L1 (first layer), an L2 (second layer), and an L3 (third layer) based three lower layers of an open system interconnection (OSI) reference model which is widely known in a communication system and among them, a physical layer that belongs to the first layer provides an information transfer service using a physical channel and a radio resource control (RRC) layer positioned on the third layer serves to control radio resources between the UE and the network. To this end, the RRC layer exchanges an RRC message between the UE and the base station.

Figure 2:
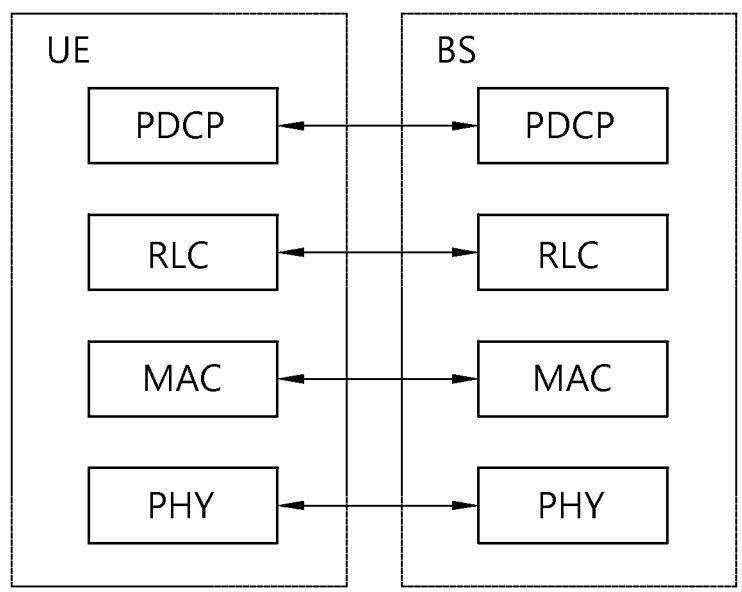
FIG. 2 is a block diagram illustrating a radio protocol architecture for a user plane.
Figure 3:
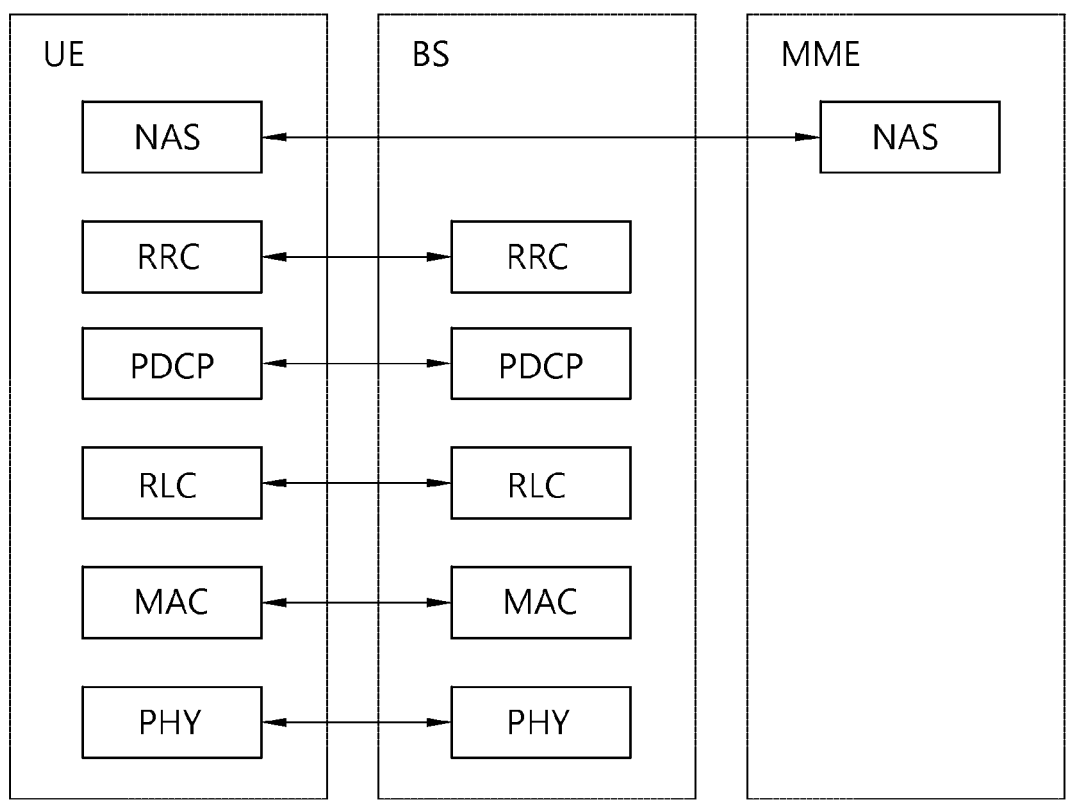
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. A data plane is a protocol stack for user data transmission and the control plane is a protocol stack for transmitting a control signal.

Referring to FIGS. 2 and 3, a physical (PHY) layer provides the information transfer service to an upper layer by using the physical channel. The physical layer is connected with a medium access control (MAC) layer as an upper layer through a transport channel. Data move between the MAC layer and the physical layer through the transport channel. The transport channel is classified depending on a transmission method and a transmission feature through a radio interface.

Data move between different physical layers, that is, between physical layers of a transmitter and a receiver through the physical channel. The physical channel may be modulated by orthogonal frequency division multiplexing (OFDM) and uses a time and a frequency as the radio resource.

A function of the MAC layer includes mapping between a logic channel and the transport channel, and multiplexing/demultiplexing to a transport block provided to the physical channel onto the transport channel of an MAC service data unit (SDU) that belongs to the logic channel. The MAC layer provides a service to a radio link control (RLC) layer through the logic channel.

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

A function of the RLC layer includes concatenation, segmentation, and reassembly of an RLC SDU. In order to assure various quality of services (QoS) requested by a radio bearer (RB), the RLC layer provides three operating modes of a transparent mode (TM), an unacknowledged mode (UM), and an acknowledged mode (AM). An AM RLC provides error correction through an automatic repeat request (ARQ).

The radio resource control (RRC) layer is defined only on the control plane. The RRC layer serves to control the logic channel, the transport channel and the physical channels in association with configuration, re-configuration, and release of radio bearers. The RB means a logic route provided by the first layer (PHY layer) and the second layers (the MAC layer, the RLC layer, and the PDCP layer) in order to transfer data between the UE and the network.

Setting the RB defines features of the radio protocol layer and channel in order to provide a specific service and means a process of setting respective detailed parameters and operating methods. The RB may be re-divided into two types of a signaling RB (SRB) and a data RB (DRB). The SRB is used as a passage for transmitting the RRC message on the control plane and the DRB is used as a passage for transmitting the user data on the user plane.

When an RRC connection is established between the RRC layer of the UE and the RRC layer of the E-UTRAN, the UE is in an RRC connected state and if not, the UE is in an RRC idle state.

A downlink transport channel for transmitting data from the network to the UE includes a broadcast channel (BCH) for transmitting system information and besides, the downlink transport channel includes a downlink shared channel (SCH) for transmitting user traffic or a control message. Traffic or a control message of a downlink multicast or broadcast service may be transported through the downlink SCH or transported through an additional downlink multicast channel (MCH). Meanwhile, an uplink transport channel for transporting data from the UE to the network includes a random access channel (RACH) for transporting an initial control message and besides, an uplink shared channel (SCH) for transporting the user traffic or control message.

The logical channel that is positioned on the transport channel and mapped to the transport channel includes a broadcast control channel (BCCH), a paging control channel (PCCH), a common control channel (CCCH), a multicast control channel (MCCH), a multicast traffic channel (MTCH), and the like.

The physical channel is constituted by a plurality of OFDM symbols in a time domain and a plurality of sub-carriers in a frequency domain. One sub-frame is constituted by the plurality of OFDM symbols in the time domain. A resource block as a resource allocation unit is constituted by the plurality of OFDM symbols and the plurality of sub-carriers. Further, each sub-frame may use specific sub-carriers of specific OFDM symbols (e.g., a first OFDM symbol) of a corresponding sub-frame for the physical downlink control channel (PDCCH), that is, an L1/L2 control channel. A transmission time interval (TTI) is a unit time of transmitting the sub-frame.

Hereinafter, the RRC state and the RRC connection method of the UE will be described in detail.

The RRC state represents whether the RRC layer of the UE is logically connected with the RRC layer of the E-UTRAN and a case in which both RRC layers are logically connected to each other is called the RRC connection state and a case in which both RRC layers are not logically connected to each other is called the RRC idle state. Since the RRC connection exists in the UE in the RRC connection state, the E-UTRAN may determine the existence of the corresponding UE by the unit of a cell to thereby effectively control the UE. On the contrary, the E-UTRAN may not determine the UE in the RRC idle state and a core network (CN) is managed by the unit of a tracking area which a region unit larger than the cell. That is, it is determined whether the UE in the RRC idle state exists by the unit of a large region, and the UE needs to move to the RRC connection state in order to receive a general mobile communication service such as voice or data.

When a user first turns on a power supply of the UE, the UE first retrieves an appropriate and thereafter, the UE stays in the RRC idle state in the corresponding cell. The UE in the RRC idle state establishes the RRC connection with the E-UTRAN through an RRC connection procedure at least when the UE in the RRC idle state needs to make the RRC connection, and is transited to the RRC connections state. Cases in which the UE in the RRC idle state needs to make the RRC connection are various, and for example, uplink data transmission is required due to a user's call attempt or when a paging message is received from the E-UTRAN, the cases may include response message transmission thereto.

A non-access stratum layer located above the RRC layer performs functions such as session management and mobility management.

In order to manage mobility of the UE on the NAS layer, two states of EPS mobility management (EMM)-REGISTERED and EMM-DEREGISTERED are defined and both states are applied to the UE and the MME. An initial UE is in the EMM-DEREGISTERED state and the UE performs a process of registering the initial UE in a corresponding network through an initial attach procedure in order to access the network. When the attach procedure is successfully performed, the UE and the MME are in the EMM-REGISTERED state.

In order to manage a signaling connection between the UE and the EPC, two states of an EPS connection management (ECM)-IDLE state and an ECM-CONNECTED state are defined and both states are applied to the UE and the MME. When the UE in the ECM-IDLE state makes the RRC connection with the E-UTRAN, the corresponding UE is in the ECM-CONNECTED state. When the MME in the ECM-IDLE state makes an S1 connection with the E-UTRAN, the MME is in the ECM-CONNECTED state. When the UE is in the ECM-IDLE state, the E-UTRAN does not have context information of the UE. Therefore, the UE in the ECM-IDLE state performs a UE based mobility associated procedure such as cell selection or cell reselection without the need for receiving a command of the network. On the contrary, when the UE is in the ECM-CONNECTED state, the mobility of the UE is managed by the command of the network. When the position of the UE in the ECM-IDLE state is different from a position which the network knows, the UE notifies a corresponding position of the UE to the network through a tracking area update procedure.

Next, the system information will be described.

The system information includes required information which the UE needs to know to access the base station. Therefore, the UE needs to receive all of the system information before accessing the base station and further, the UE continuously needs to have latest system information. In addition, since the system information is information which all UEs in one cell need to know, the base station periodically transmits the system information.

According to Phrase 5.2.2 of 3GPP TS 36.331 V8.7.0 (2009-09) "Radio Resource Control (RRC); Protocol specification (Release 8)", the system information is divided in to a master information block (MIB), a scheduling block (SB), and a system information block (SIB). The MIB allows the UE to know a physical component, for example, a bandwidth. The SB allows the UE to know transmission information of the SIBs, for example, a transmission period, and the like. The SIB is an aggregate of associated system information. For example, any SIB includes only information on a neighboring cell and any SIB includes only information on a uplink wireless channel used by the UE.

In general, a service which the network provides to the UE may be divided into three types. Further, the UE differently recognizes even a type of the cell by considering which service the UE receives. The service type will be first described below and thereafter, the type of the cell will be described.

1) Limited service: The service may provide an emergency call and an earthquake and Tsunami warning system (ETWS), and provide the emergency call and the earthquake and Tsunami warning system (ETWS) in an acceptable cell.

2) Normal service: The service may mean a public use general service and may provide the public use general service in a suitable or normal cell.

3) Operator service: The service may mean a service for a communication network operator and only the communication network operator may use the cell and a general user may not use the cell.

The type of the cell may be divided as below in association with the service type provided by the cell.

1) Acceptable cell: Cell where the UE may receive the limited service. The cell is a cell that is not barred in terms of the corresponding UE and satisfies a cell selection criterion of the UE.

2) Suitable cell: Cell where the UE may receive the suitable service. The cell satisfies a condition of the acceptable cell and simultaneously, satisfies additional conditions. As the additional conditions, the cell needs to belong to a public land mobile network (PLMN) which the corresponding UE may access and needs to be a cell where execution of the tracking area update procedure of the UE is not barred. When the corresponding cell is the CSG cell, the corresponding cell needs to be a cell where the UE may access the cell as a CSG member.

3) Barred cell: The cell is a cell where information indicating that the corresponding cell is a cell barred through the system information is broadcasted.

4) Reserved cell: The cell is a cell where information indicating that the corresponding cell is a cell reserved through the system information is broadcasted.

Figure 4:
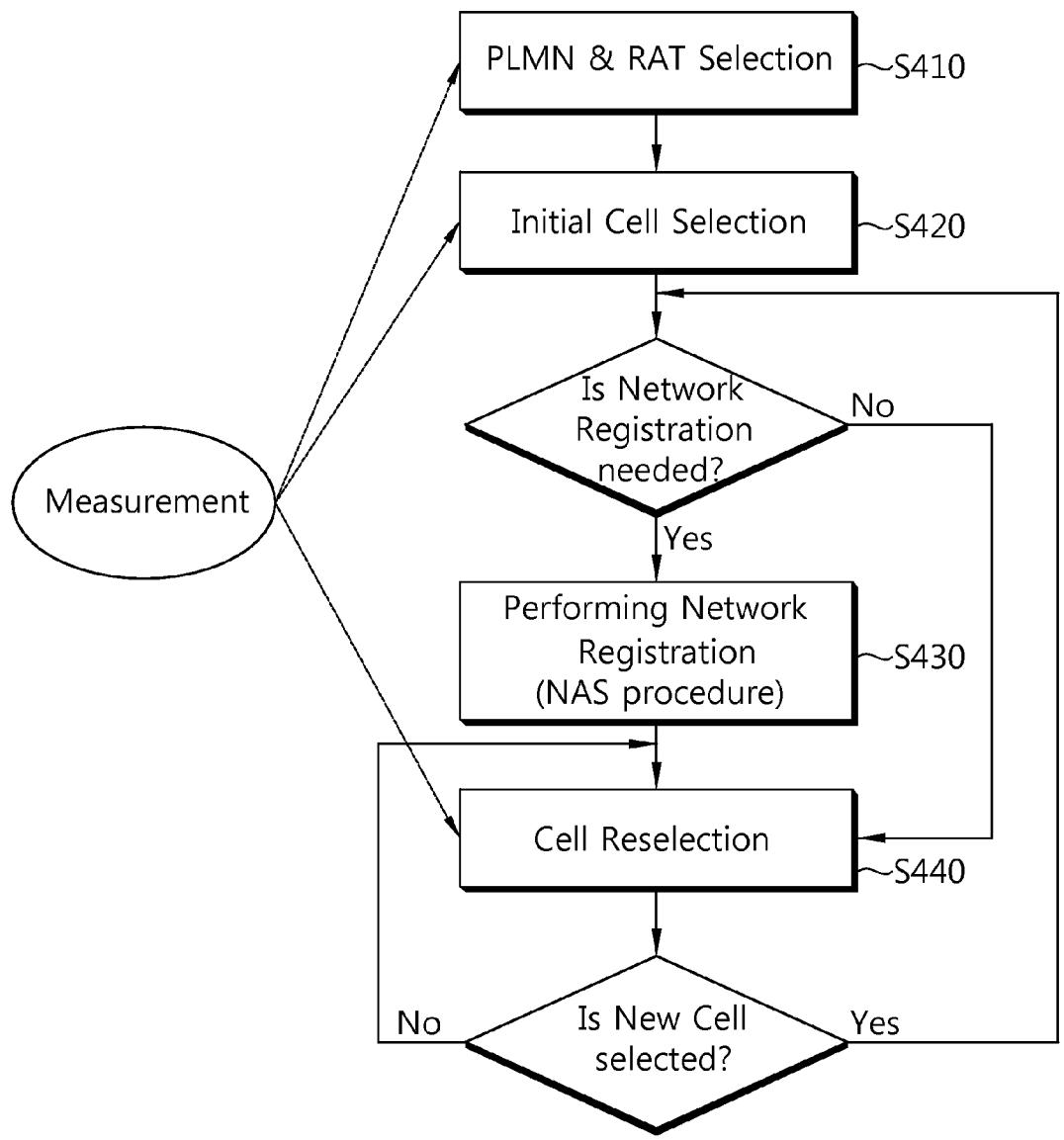
FIG. 4 is a flowchart illustrating an operation of a UE in an RRC idle state.

FIG. 4 is a flowchart illustrating an operation of a UE in an RRC idle state. FIG. 4 illustrates a procedure of registering a UE of which initial power is turned on in the network through a cell selection process and thereafter, cell reselection is performed as necessary.

Referring to FIG. 4, the UE selects radio access technology (RAT) for communicating with the public land mobile network from which the UE itself intends to receive the service (S410). Information on the PLMN and the RAT may be selected by a user of the UE and the information stored in a universal subscriber identity module (USIM) may be used.

The UE selects a cell having a largest value among cell having measured larger signal intensity or quality than specific values (cell selection) (S420). The UE of which power is turned on performs the cell selection and the execution of the cell selection may be called initial cell selection. A cell selection procedure will be described below in detail. After the cell selection, the UE receives the system information which the base station periodically sends. The aforementioned specific value represents a value defined in the system in order to receive an assurance for quality of a physical signal in transmitting/receiving data. Therefore, the value may vary depending on the applied RAT.

When network registration is required, the UE performs a network registration procedure (S430). The UE registers its own information (e.g., IMSI) in order to receive a service (e.g., paging) n from the network. The UE does not register the information in the accessed network whenever selecting the cell, and registers the information when information (e.g., a tracking area identity (TAI) of the network that receives from the system information) is different from information on a network known by the UE).

The UE performs the cell reselection based on a service environment provided by the cell or an environment of the UE (S440). When a value of measured intensity or quality of the signal from a base station from which the UE receives the service is smaller than a value measured from a base station of a neighboring cell, the UE selects one of other cells that provide a more excellent signal feature than the cell of the base station accessed by the UE. This process is distinguished from the initial cell selection as Process No. 2 to be cell re-selection. In this case, a temporal constraint is given in order to prevent the cell from being frequently reselected with the variation of the signal feature. A cell selection procedure will be described below in detail.

Figure 5:
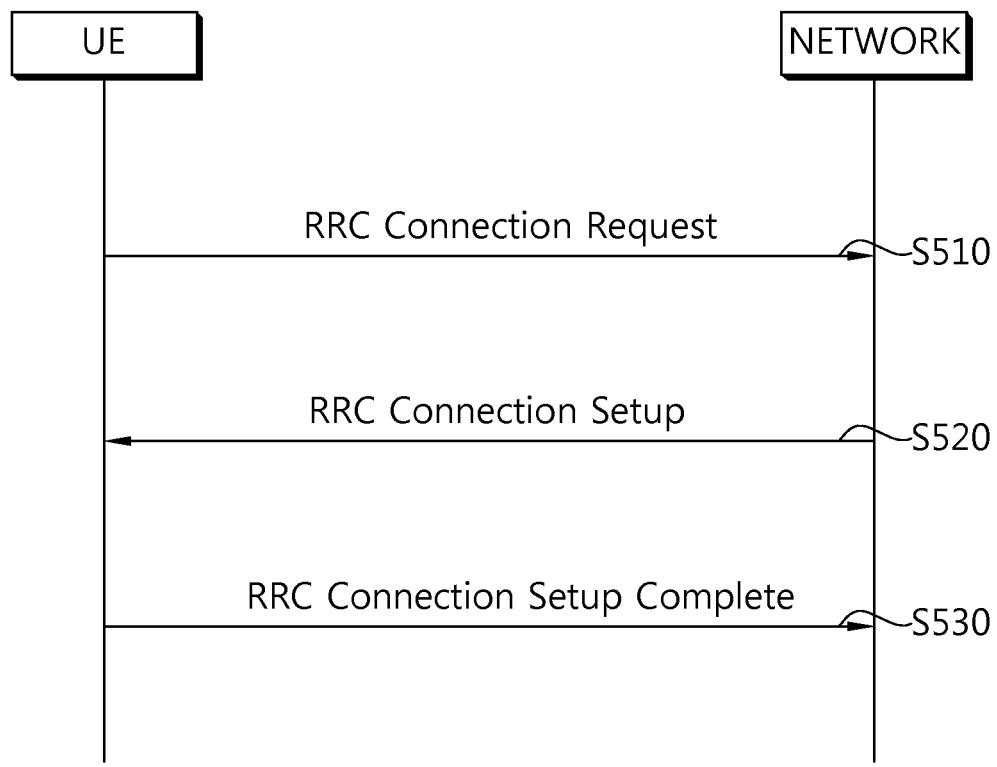
FIG. 5 is a flowchart illustrating a process of establishing an RRC connection.

FIG. 5 is a flowchart illustrating a process of establishing an RRC connection.

The UE sends to the network an RRC connection request message for requesting the RRC connection (S510). The network sends an RRC connection setup message as a response to the RRC connection request (S520). The UE enters an RRC connection mode after receiving the RRC connection setup message.

The UE sends to the network an RRC connection setup complete message used to verify successful completion of establishing the RRC connection (S530).

Figure 6:
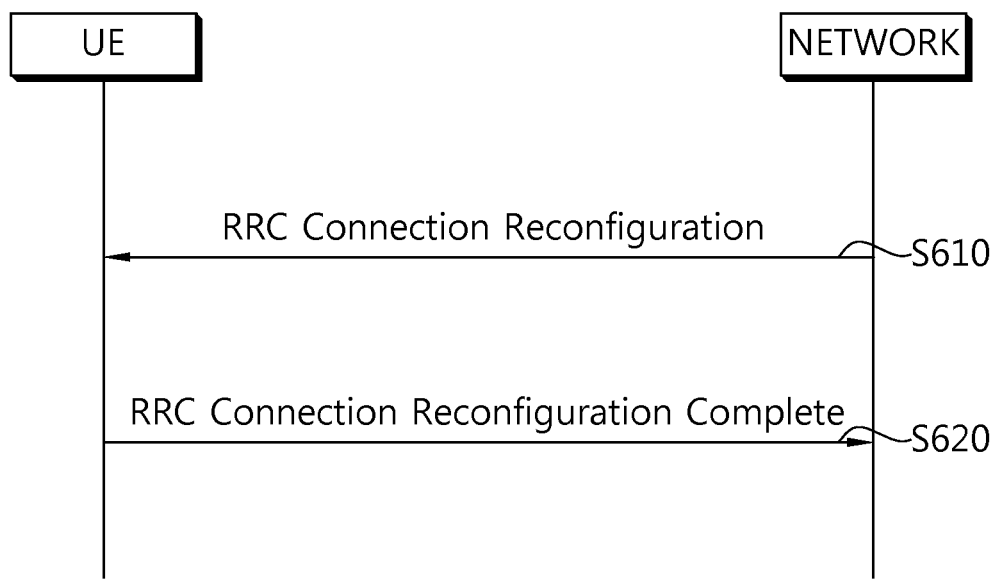
FIG. 6 is a flowchart illustrating a process of reconfiguring the RRC connection.

FIG. 6 is a flowchart illustrating a process of reconfiguring the RRC connection. The RRC connection reconfiguration is used to modify the RRC connection. The RRC connection reconfiguration is used for perform RB establishment/modification/release, handover, and measurement setup/modification/release.

The network sends to the UE an RRC connection setup message for modifying the RRC connection (S610). The UE sends to the network an RRC connection reconfiguration complete message used to verify successful completion of establishing the RRC connection reconfiguration as a response to the RRC connection reconfiguration (S620).

Next, a procedure in which the UE selects the cell will be described in detail.

When the power of the UE is turned on or the UE stays in the cell, the UE performs procedures for receiving the service by selecting/reselecting a cell having appropriate quality.

The UE in the RRC idle state needs to prepare for receiving the service through the cell by continuously selecting the cell having the appropriate quality. For example, the UE of which the power is just turned on needs to select the cell having the appropriate quality for registration in the network. When the UE in the RRC connection state enters the RRC idle state, the UE needs to select a cell to stay in the RRC idle state. As such, a process in which the UE selects a cell that satisfies a predetermined condition in order to stay in a service stand-by state such as the RRC idle state is referred to as the cell selection. Since the UE performs the cell selection while the cell in the RRC idle state may not be decided at present, it is important to select the cell rapidly as possible. Therefore, in the case of a cell that provides radio signal quality having a predetermined reference or more, even though the cell is not a cell that provides the best radio signal quality for the UE, the cell may be selected in the cell selection process by the UE.

Hereinafter, a method and a procedure for selecting the cell by the UE in the 3GPP LTE will be described in detail with reference to 3GPP TS 36.304 V8.5.0 (2009-03) "User Equipment (UE) procedures in idle mode (Release 8)".

When the power of the UE is turned on at an initial stage, the UE retrieves the public land mobile network (PLMN) and selects an appropriate PLMN capable of receiving the service. The PLMN is a network that is deployed or operated by a mobile network operator. Each mobile network operator operates one or more PLMNs. The respective PLMNs may be identified by a mobile country code (MCC) and a mobile network code (MNC). PLMN information of the cell is included in the system information and broadcasted. The UE attempts to register the selected PLMN. When the registration is succeeded, the selected PLMN becomes a registered PLMN (RPLMN). The network may signal a PLMN list to the UE and the PLMNs included in the PLMN list may be considered as the PLMN such as the RPLMN. The UE registered in the network needs to be reachable by the network. When the UE is in the ECM-CONNECTED state (similarly, the RRC connection state), the network recognizes that the UE receives the service). However, when the UE is in the ECM-IDLE state (similarly, the RRC idle state), a situation of the UE is not effective in the eNB, but the situation is stored in the MME. In this case, the position of the UE which is in the ECM-IDLE state is known to only the MME as granularity of a list of tracking areas (TAs). A single TA is identified by a tracking area identity configured by the PLMN identity to which the TA belongs and the tracking area code (TAC) uniquely expressing the TA in the PLMN.

Subsequently, the UE selects a cell having signal quality and feature to receive an appropriate service among cells provided by the selected PLMN.

The cell selection process is generally divided into two types.

First, as an initial cell selection process, the UE has no advance information on the radio channel during this process. Therefore, the UE retrieves all radio channels in order to find the appropriate cell. The UE finds the strongest cell in each channel. Thereafter, the UE selects the corresponding cell only at the time of finding the suitable cell that satisfies the cell selection criterion.

Next, the UE may select the cell by using stored information or using information broadcasted in the cell. Therefore, the cell selection may be rapidly performed as compared with the initial cell selection process. When the UE only finds the cell that satisfies the cell selection criterion, the UE selects the corresponding cell. When the UE does not find the suitable cell that satisfies the cell selection criterion through such a process, the UE performs the initial cell selection process.

After the UE selects a predetermined cell through the cell selection process, the strength or quality of the signal between the UE and the base station may be changed due to the mobility of the UE or a change of a wireless environment. Therefore, when the quality of the selected cell deteriorates, the UE may select another that provides higher quality. When the cell is again selected as such, a cell that provides higher signal quality than the currently selected cell is generally selected. The process is referred to as the cell reselection. The cell reselection process generally has a basic object o select the cell having the highest quality to the UE.

In addition to the quality of the radio signal, the network decides a priority for each frequency to notify the priority to the UE. The UE that receives the priority preferentially considers the priority to a radio signal quality criterion during the cell reselection process.

There may be a method for selecting or reselecting the cell according to the signal feature of the wireless environment and there may be a cell reselection method described below according to the features of the RAT and the frequency of the cell.

Intra-frequency cell reselection: The UE reselect a cell having the same RAT and the same center-frequency as a cell which is being camping.

Inter-frequency cell reselection: The UE reselects a cell having the same RAT and a different center-frequency as the cell which is being camping.

Inter-RAT cell reselection: The UE reselect a cell using an RAT different from an RAT which is being camping.

A principle of the cell reselection process will be described below.

First, the UE measures the qualities of the serving cell and the neighboring cell for the cell reselection.

Second, the reselection is performed based on the cell reselection criterion. The cell reselection criterion has features described below in association with the measurement of the serving cell and the neighboring cell.

The intra-frequency cell reselection is basically based on ranking. The ranking defines an index value for evaluating the cell reselection and the cells are ordered in the order of the index value by using the index value. A cell having the best index is generally called a best ranked cell. The cell index value is based on a value which the UE measures for the corresponding cell and is applied with a frequency offset or a cell offset as necessary.

The inter-frequency cell reselection is based on a frequency priority provided by the network. The UE attempts to camp on a frequency having the highest frequency priority. The network may provide the frequency priority to which in-cell UEs will commonly apply through broadcast signaling or provide a frequency-dedicated priority for each UE through UE-dedicated signaling.

The network may provide a parameter (e.g., a frequency-specific offset) used for the cell reselection to the UE for the inter-frequency cell reselection for each frequency.

The network may provide a neighboring cell list (NCL) used for the cell reselection to the UE for the intra-frequency cell reselection or the inter-frequency cell reselection. The NCL includes a cell-specific parameter (e.g., cell-specific offset) used in the cell reselection.

The network may provide a cell reselection black list used for the cell reselection to the UE for the intra-frequency cell reselection or the inter-frequency cell reselection. The UE does not perform the cell reselection for a cell included in the black list.

Subsequently, the ranking performed during the cell reselection evaluating process will be described.

A ranking criterion used to give the priority of the cell is defined as illustrated in Equation 1.

$$R_S = Q_{meas,s} + Q_{hyst}, R_n = Q_{meas,n} - Q_{offset} \quad \text{[Equation 1]}$$

Herein, Rs represents a ranking criterion of the serving cell, Rn represents a ranking criterion of the neighboring cell, Qmeas,s represents a quality value which the UE measures for the serving cell, Qmeas,n represents a quality value which the UE measures for a neighboring cell, Qhyst represents a hysteresis value for the ranking, and Qoffset represents an offset between two cells.

In an intra-frequency, when the UE receives an offset Qoffsets,n between the serving cell and the neighboring cell, Qffoset=Qoffsets,n and when the UE does not receive Qoffsets,n, Qoffset=0.

In an inter-frequency, when the UE receives the offset Qoffsets,n fir the corresponding cell, Qoffset=Qoffsets,n+Qfrequency and when the UE does not receive Qoffsets,n, Qoffset=Qfrequency.

When the ranking varies while the ranking criterion Rs of the serving cell and the ranking criterion of the neighboring cell Rn are similar to each other, the ranking is frequently reversed, and as a result, the UE may alternatively reselect both cells. Qhyst represents a parameter for preventing the UE from alternatively reselecting both cells by giving hysteresis in cell reselection.

The UE measures the Rs of the serving cell and the Rn of the neighboring cell according to the above equation and regards a cell having the largest ranking criterion value as the best ranked cell and reselects this cell.

According to the criterion, it can be seen that the quality of the cell acts as the most important criterion in the cell reselection. If the reselected cell is not the suitable cell, the UE excludes the corresponding frequency or the corresponding cell from a cell reselection target.

Hereinafter, Radio Link Monitoring (RLM) is described.

A user equipment monitors downlink quality based on a cell-specific reference signal for sensing downlink radio link quality of a PCell. The user equipment estimates downlink radio link quality for the purpose of monitoring the downlink radio link quality of the PCell and compares the estimated result with thresholds Qout and Qin. The threshold Qout is defined as a level where a downlink radio link cannot be received stably, and this corresponds to a 10% error block error rate of hypothetical PDCCH transmission taking into account a PDFICH error. The threshold Qin is defined as a downlink radio link quality level at which reception may be made more stable than at the Qout level, and this corresponds to a 2% block error rate of hypothetical PDCCH transmission considering a PCFICH error.

A radio link failure is now described.

A user equipment continues to perform measurement in order to maintain quality of a radio link with a serving cell receiving a service. The user equipment determines whether communication is impossible under current circumstance due to a quality deterioration of a radio link with the serving cell. If the quality of the serving cell is too low and thus communication is nearly impossible, the user equipment determines the current circumstance as being at a radio link failure.

If it is determined a radio link failure, the user equipment abandons communication with the current serving cell and chooses a new cell through a cell selection (or cell reselection) procedure, then attempting to do RRC connection re-establishment to the new cell.

3GPP LTE standards provide the following as examples of normal communication being impossible:

- When determined that the user equipment has a serious problem with the downlink communication link quality based on a radio quality measurement result of the user equipment's physical layer (when determined that PCell's quality is low while performing RLM)
- When determined that there is a problem with uplink transmission due to continuous failures in random access procedure in the MAC sublayer.
- When determined that there is a problem with uplink transmission due to continuous failures in uplink data transmission in RLC sublayer.
- When determined that handover has failed.
- When the message received by the user equipment fails to pass integrity test.

Hereinafter, an RRC connection re-establishment procedure is described in greater detail.

Figure 7:
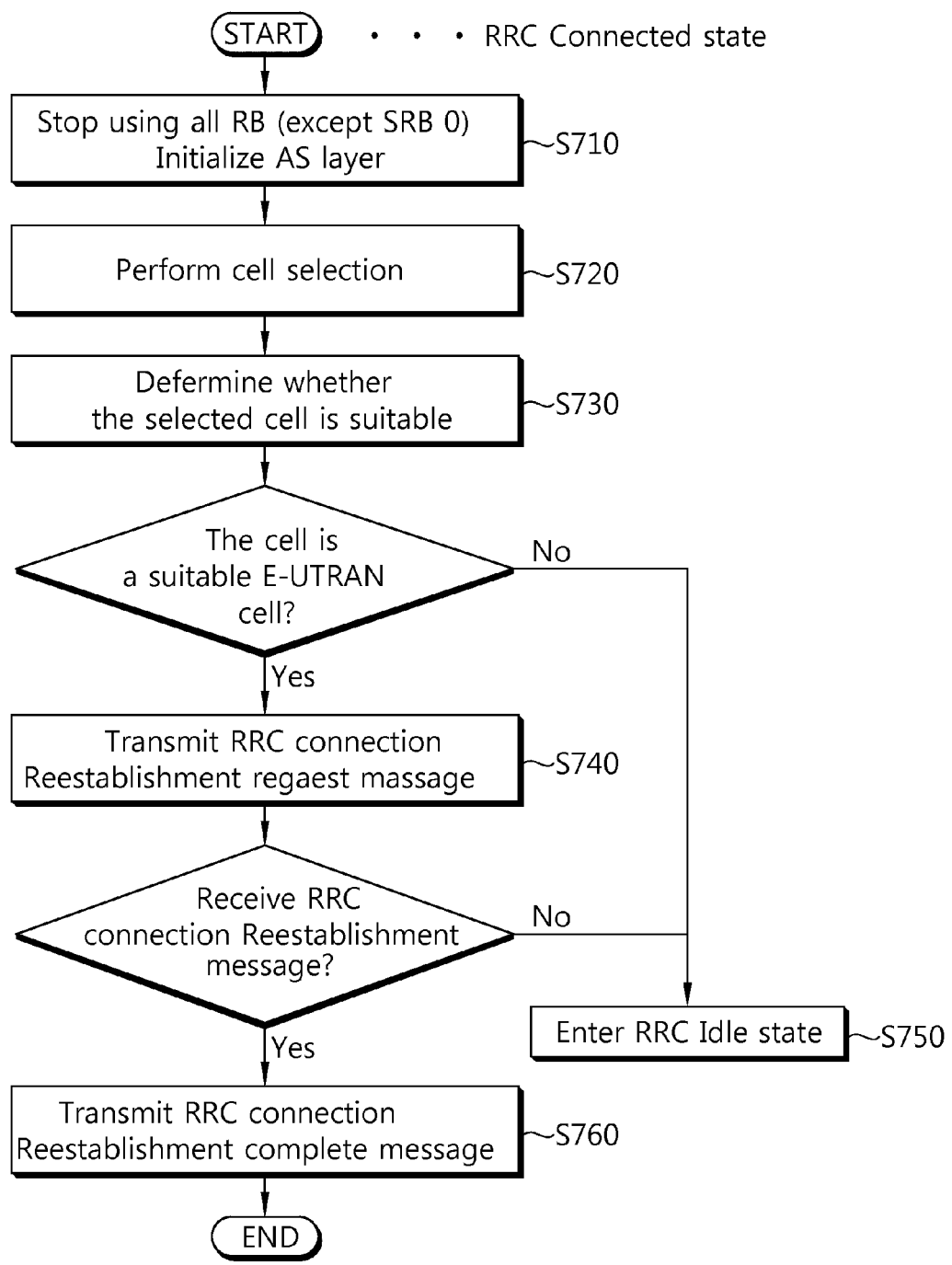
FIG. 7 is a view illustrating an RRC connection re-establishment procedure.

FIG. 7 is a view illustrating an RRC connection re-establishment procedure.

Referring to FIG. 7, a user equipment stops using all configured radio bearers except SRB 0 (Signaling Radio Bearer #0) and initializes various sublayers of the Access Stratum (AS) (S710). Further, the user equipment sets each sublayers and physical layer as default configurations. During this course, the user equipment maintains an RRC connected state.

The user equipment performs a cell selection procedure for fulfilling an RRC connection re-establishment procedure (S720). The cell selection procedure of the RRC connection re-establishment procedure may be carried out like the cell selection procedure that is performed by the user equipment in an RRC idle state.

The user equipment determines whether a corresponding cell is a proper cell by checking system information of a corresponding cell after performing the cell selection procedure (S730). In case the selected cell is determined to be a proper E-UTRAN cell, the user equipment sends an RRC connection re-establishment request message to a corresponding cell (S740).

Meanwhile, in case it is determined that the cell selected through a cell selection procedure for performing an RRC connection re-establishment procedure is a cell using other RAT than E-UTRAN, the RRC connection re-establishment procedure is stopped and the user equipment enters into the RRC idle state (S750).

The user equipment may be implemented to finish identifying a cell's properness within a limited time by a cell selection procedure and receiving system information of the selected cell. For this, the user equipment may drive a timer as it initiates the RRC connection re-establishment procedure. The timer may be paused in case the user equipment is determined to have selected a proper cell. In case the timer expires, the user equipment deems the RRC connection re-establishment procedure as failing and may enter into the RRC idle state. This timer, hereinafter, is referred to as a radio link failure timer. In LTE standards TS 36.331, a timer named T311 may be put to use as the radio link failure timer. The user equipment may acquire the timer's set value from the system information of the serving cell.

When receiving the RRC connection re-establishment request message from the user equipment and accepting the request, the cell sends out an RRC connection re-establishment message.

When receiving the RRC connection re-establishment message from the cell, the user equipment reconfigures an RLC sublayer and a PDCP sublayer on SRB1. Further, the user equipment re-calculates various key values related to security setting and reconfigures a PDCP sublayer in charge of security with the newly calculated security key values. By doing so, SRB1 between the user equipment and the cell is opened and an RRC control message may be exchanged. The user equipment completes resuming SRB1 and sends an RRC connection re-establishment complete message indicating the RRC connection re-establishment procedure to the cell (S760).

In contrast, when receiving the RRC connection re-establishment request message from the user equipment and not accepting the request, the cell sends to the user equipment an RRC connection re-establishment reject message.

If the RRC connection re-establishment procedure is successfully performed, the cell and the user equipment conduct an RRC connection re-establishment reconfiguration procedure. Accordingly, the user equipment turns back to the state before performing the RRC connection re-establishment procedure and maximally guarantees service continuity.

The user equipment, if an RLF or handover failure occurs, reports such failure event to the network in order to support the network's Mobility Robustness Optimization (MRO).

When reestablishing RRC connection, the user equipment may offer an RLF report to an eNB. Radio measurement included in the RLF report may be used as potential cause of failure so as to identify coverage issues. This information may be used in MRO evaluation for intra-LTE mobility connection failure, in order to exclude such events and put other events to use as inputs for other algorithms.

In case RRC connection re-establishment fails or the user equipment fails to perform RRC connection re-establishment, the user equipment may make reconnection in the idle mode and then generate a valid RLF report for the eNB. For such purpose, the user equipment may store information regarding the latest RLF or handover failure, and until the RLF report is brought up by the network or for 48 hours after the RLF or handover failure is sensed, may inform the LTE cell that RLF report is valid at every subsequent RRC connection (re)establishment and handover.

The user equipment maintains the information while it undergoes a state shift and RAT varies, and after back to the LTE RAT, indicates again that RLF report is valid.

The RLF report being valid in the RRC connection configuration procedure is to indicate that the user equipment is interfered, like going through connection failure, and due to such failure, the RLF report is not yet delivered to the network. The RLF report from the user equipment contains the following information:

Last cell that has offered service to the user equipment (in case of RLF) or target's E-CGI in handover. Unless E-CGI has been known, PCI and frequency information are used instead.

E-CGI of the cell where reestablishment has been attempted.

E-CGI of the cell that provided service to the user equipment upon initialization of the last handover, as an example, when message 7 (RRC connection reconfiguration) was received by the user equipment.

Elapsed time from last handover initialization to connection failure.

information indicating whether connection failure is attributed to RLF or handover failure.

Radio measurements.

failure's position.

When receiving the RLF failure from the user equipment, the eNB may forward the report to the eNB that provided service to the user equipment before the reported connection failure.

In a mobile communication system, it is inevitable for a user equipment to support mobility. Accordingly, the user equipment continuously measures quality for a serving cell currently providing service and quality for a neighbor cell. The user equipment reports a measurement result to the network at a proper time, and the network provides the optimal mobility to the user equipment through, e.g., handover. The measurement for such purpose is often referred to as Radio Resource Management (RRM) measurement.

The user equipment, in order to provide information helping a service provider to operate a network in addition to the purpose of supporting mobility, may perform measurement for a specific purpose configured by the network and report a measurement result to the network. For example, the user equipment receives broadcast information of a specific cell determined by the network. The user equipment may report the serving cell with a cell identifier of the specific cell (this is also referred to as a global cell identifier), information for identifying the location where the specific cell belongs (for example, Tracking Area Code), and/or other cell information (for example, whether a Closed Subscriber Group (CSG) cell is a member).

When the user equipment, which is on the move, identifies that quality of a specific area is very bad through measurement, the user equipment may report the location information on the band-quality cells and measurement result to the network. The network may achieve its optimization based on the measurement result reports from the user equipments helping operating the network.

In a mobile communication system having a frequency reuse factor of 1, mobility may be mostly attained between different cells that belong to the same frequency band. Accordingly, in order to insure the user equipment's mobility well, the user equipment should be able to measure well cell information and quality of neighbor cells having the same center frequency as the serving cell. As such, measurement on the cell having the same center frequency as the center frequency of the serving cell is referred to as intra-frequency measurement. The user equipment conducts intra-frequency measurement and reports the measurement result to the network at a proper time, so that the goal corresponding to the measurement result can be achieved.

A mobile service provider may operate a network using a plurality of frequency bands. In case a communication system service is offered through a plurality of frequency bands, the user equipment, in order for the optimal mobility to be provided to the user equipment, should be able to measure well cell information and quality of neighbor cells having different center frequencies than the center frequency of the serving cell. As such, measurement on the cell having a different center frequency than the center frequency of the serving cell is referred to as inter-frequency measurement. The user equipment should be able to conduct inter-frequency measurement and report the measurement result to the network at a proper time.

In case the user equipment supports measurement on a heterogeneous network, measurement on a cell in the heterogeneous network may be conducted by the base station configuration. Such measurement on the heterogeneous network is referred to as inter-Radio Access Technology (RAT) measurement. For example, the RAT may include GSM EDGE Radio Access Network (GERAN) and UMTS Terrestrial Radio Access Network (UTRAN) observing the 3GPP standards, as well as CDMA 2000 systems that follow the 3GPP2 standards.

Figure 8:
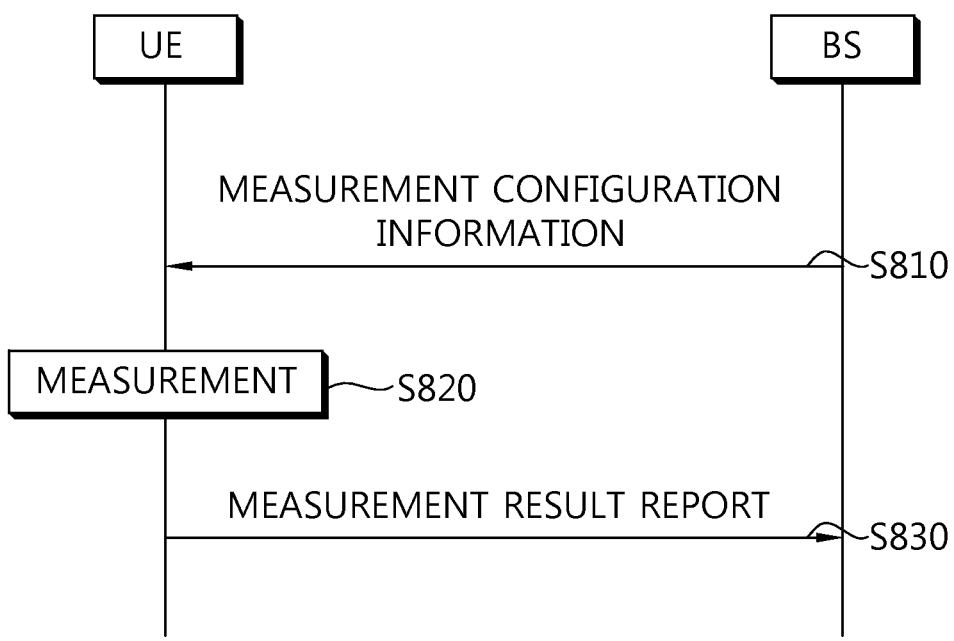
FIG. 8 is a flowchart illustrating a conventional method of performing measurement.

FIG. 8 is a flowchart illustrating a conventional method of performing measurement.

The user equipment receives measurement configuration information from the base station (S810). A message containing the measurement configuration information is referred to as a measurement configuration message. The user equipment conducts measurement based on the measurement configuration information (S820). The user equipment reports a measurement result to the base station if the measurement result meets a reporting condition in the measurement configuration information (S830). A message containing the measurement result is referred to as a measurement report message.

The measurement configuration information may contain the following information:

(1) measurement object information: information regarding an object on which the user equipment is to conduct measurement. The measurement object includes at least any one of an intra-frequency measurement object that is an intra-cell measurement object, an inter-frequency measurement object that is an inter-cell measurement object, and an inter-RAT measurement object that is an object of inter-RAT measurement. For example, the intra-frequency measurement object may indicate a neighbor cell having the same frequency band as the serving cell, the inter-frequency measurement object may indicate a neighbor cell having a different frequency band from the serving cell, and the inter-RAT measurement object may indicate a neighbor cell of a different RAT from a RAT of the serving cell.

(2) Reporting configuration information: information on the reporting condition and type as to when the user equipment reports a measurement result. The reporting condition may contain information regarding a period or event triggering a measurement result report. The reporting type is information as to what type a measurement result is configured in.

(3) measurement identifier information: information on a measurement identifier linking a measurement object with a reporting configuration to thereby determine in what type the user equipment is to report on what measurement object. Each measurement identifier links a measurement object to a reporting configuration. By configuring multiple measurement identifiers, it is available that more than one measurement object is linked to the identical reporting configuration as well as more than one reporting configuration is linked to the identical measurement object. The measurement identifier may be used as a reference number in the measurement report. The measurement identifier information is included in a measurement reporting message and represents which measurement object is in relation to the measurement result, and which reporting condition is used to output the measurement report.

(4) Quantity configuration information: The quantity configuration information defines the quantity of measurement and relevant filtering used for the evaluation of the all events and reporting involved in the measurement type. One filter may be configured per measurement quantity.

(5) Measurement gap information: This is information for the measurement gap which is an interval that can be used only for measuring without consideration of the data transmission between a UE and the serving cell, which is caused that the downlink transmission or the uplink transmission is not scheduled.

The user equipment has a measurement object list, a reporting configuration list and a measurement identifier list to perform a measurement procedure.

In 3GPP LTE, a base station may configure for a user equipment only one measurement object per frequency band. According to 3GPP TS 36.331 V8.5.0 (2009-03) "Evolved Universal Terrestrial Radio Access (E-UTRA) Radio Resource Control (RRC); Protocol specification (Release 8)" Ch. 5.5.4, events triggering a measurement report are defined as shown in the following table.

TABLE 1

| Event | Reporting Condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the user equipment's measurement result meets a configured event, the user equipment sends a measurement report message to the base station.

Figure 9:
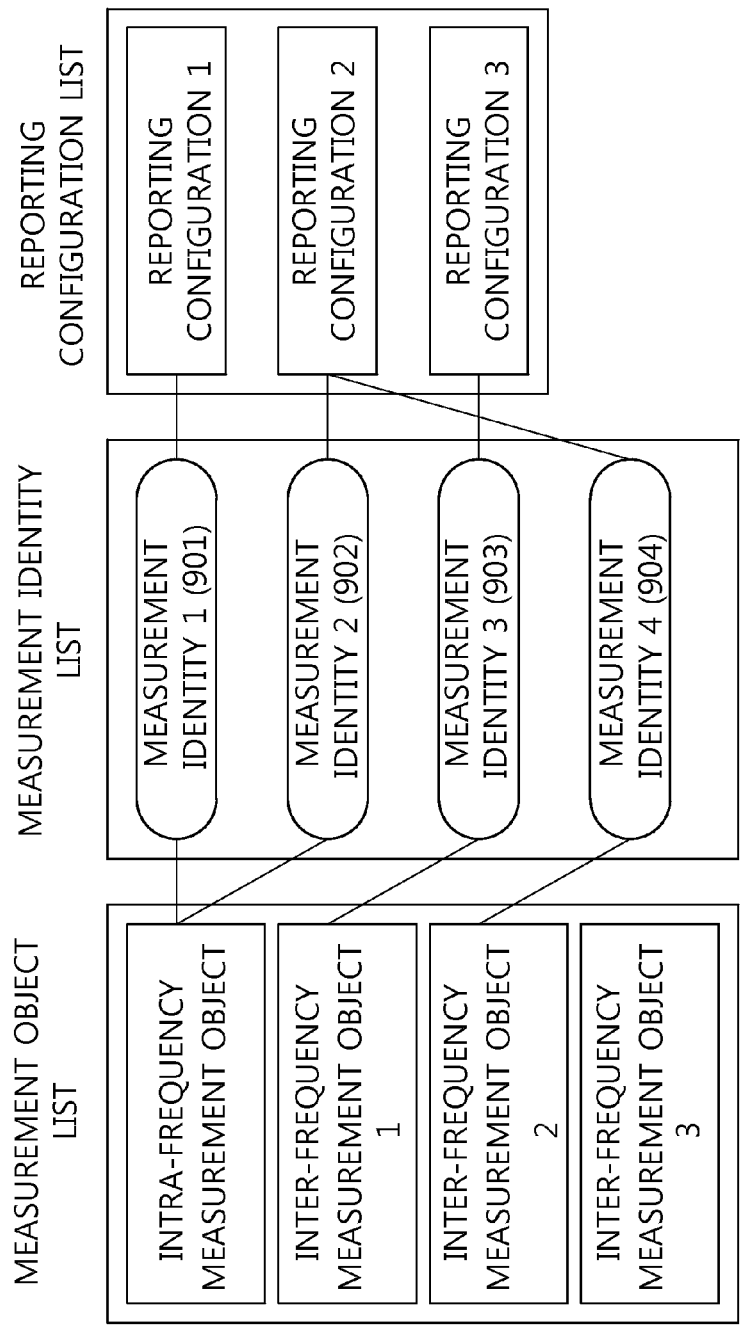
FIG. 9 shows an example of a measurement configuration configured in a user equipment.

FIG. 9 shows an example of a measurement configuration configured in a user equipment.

First, measurement identifier 1 links an intra-frequency measurement object with reporting configuration 1 901. The user equipment conducts intra-frequency measurement and uses reporting configuration 1 for determining a reference of a measurement result report and reporting type.

Measurement identifier 2 902, like measurement identifier 1, is linked with an intra-frequency measurement object, but links the intra-frequency measurement object with reporting configuration 2. The user equipment conducts measurement and uses reporting configuration 2 for determining a reference of measurement result report and reporting type.

By measurement identifier 1 901 and measurement identifier 2 902, the user equipment sends a measurement result on the intra-frequency measurement object as long as the measurement result satisfies either reporting configuration 1 and reporting configuration 2.

Measurement identifier 3 903 links inter-frequency measurement object 1 with reporting configuration 3. The user equipment reports a measurement result on inter-frequency measurement object 1 if the measurement result meets a reporting condition contained in reporting configuration 1.

Measurement identifier 4 904 links inter-frequency measurement object 2 with reporting configuration 2. The user equipment reports a measurement result on inter-frequency measurement object 2 when the measurement result meets a reporting condition included in reporting configuration 2.

Meanwhile, measurement objects, reporting configurations, and/or measurement identifiers may be added, changed, and/or deleted. This may be indicated by the base station sending a new measurement configuration message or measurement configuration changing message to the user equipment.

Figure 10:
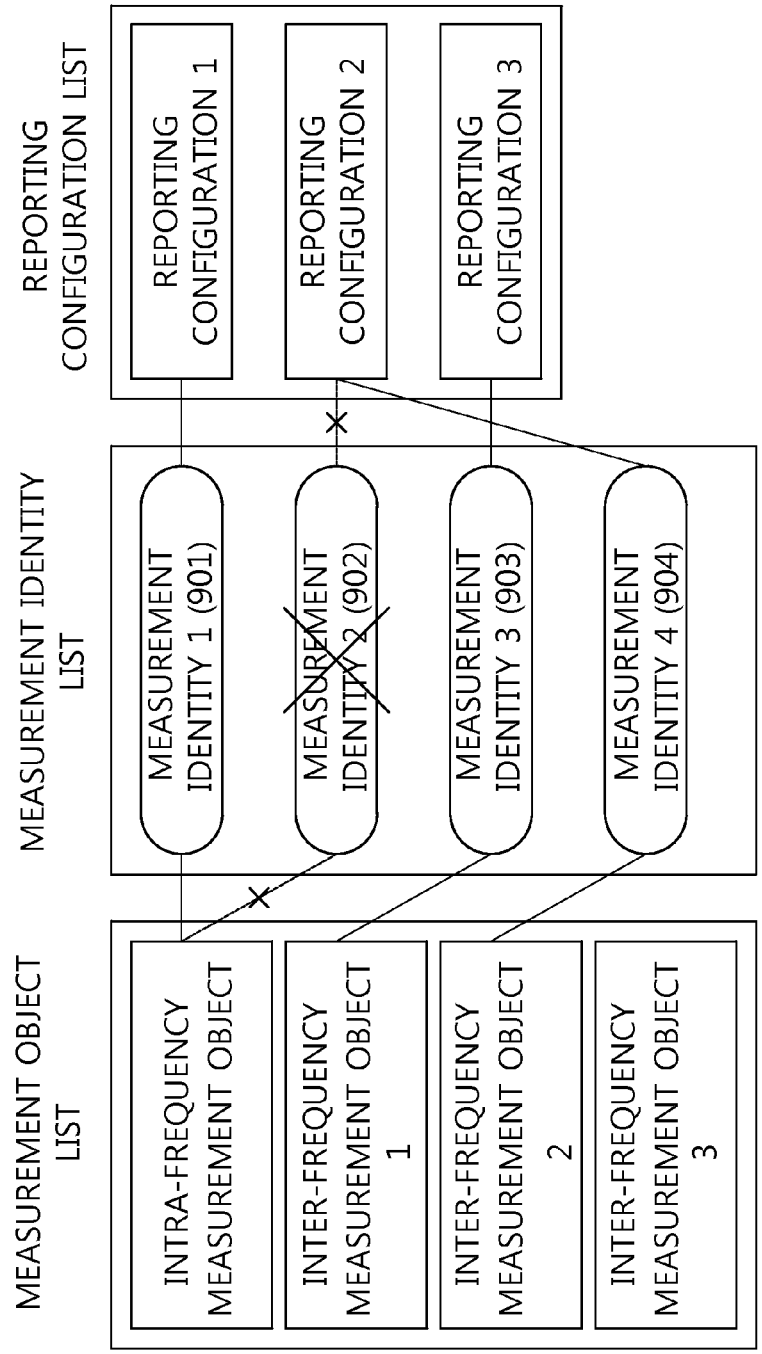
FIG. 10 shows an example of deleting a measurement identifier.

FIG. 10 shows an example of deleting a measurement identifier. If measurement identifier 2 902 is deleted, measurement on the measurement object associated with measurement identifier 2 902 is stopped, and no measurement report is sent out. The measurement object or reporting configuration associated with the deleted measurement identifier might not be changed.

Figure 11:
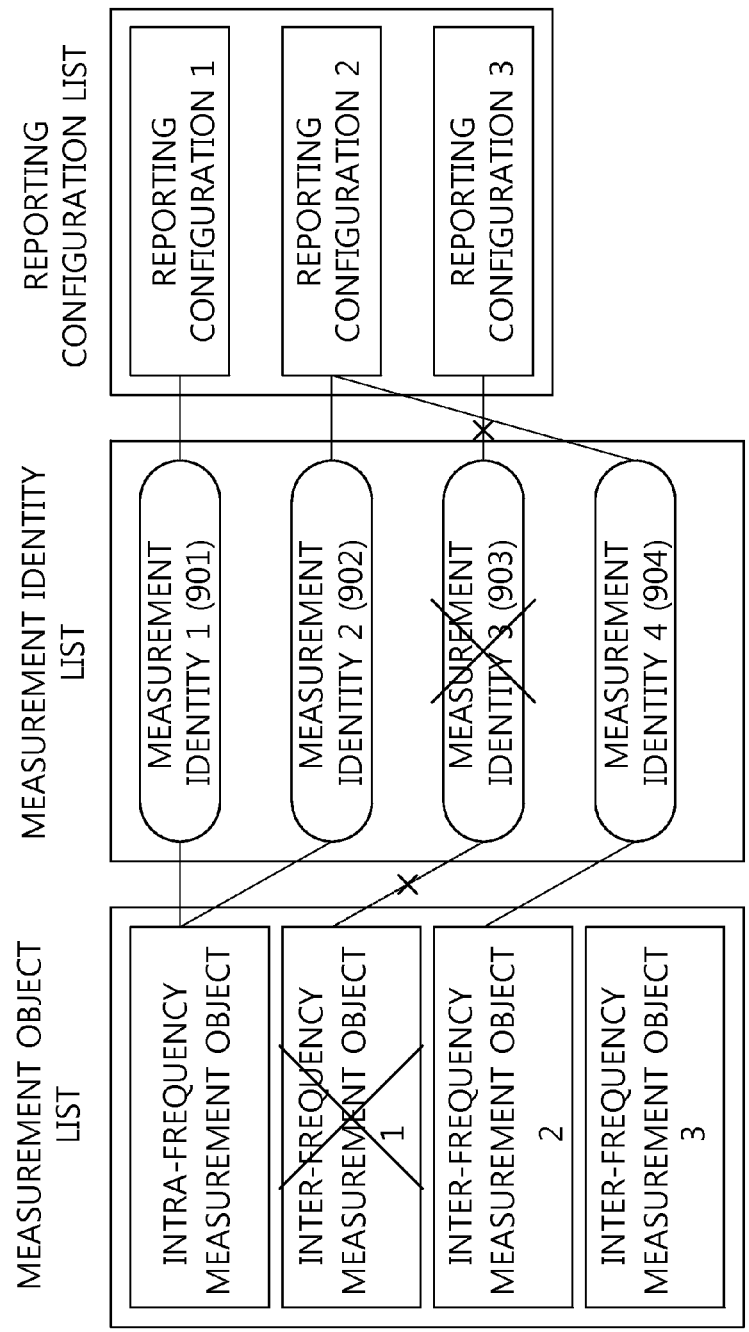
FIG. 11 shows an example of deleting a measurement object.

FIG. 11 shows an example of deleting a measurement object. If inter-frequency measurement object 1 is deleted, the user equipment deletes measurement identifier 3 903 associated thereto, as well. Measurement on inter-frequency measurement object 1 is stopped and no measurement report is sent out. However, the reporting configuration associated with the deleted inter-frequency measurement object 1 might not be varied or deleted.

If a reporting configuration is removed, the user equipment leaves out a measurement identifier associated thereto, as well. The user equipment pauses measurement on the measurement object associated by the associated measurement identifier. However, the measurement object associated with the deleted reporting configuration might not be varied or deleted.

The measurement report may contain a measurement identifier, measured quality of the serving cell, and a measurement result of a neighbor cell. The measurement identifier identifies a measurement object for which a measurement report has been triggered. The measurement result of the neighbor cell may contain the neighbor cell's cell identifier and measured quality. The measured quality may contain at least one of Reference Signal Received Power (RSRP) and Reference Signal Received Quality (RSRQ).

Hereinafter, accessibility measurement is described.

There are many aspects as to coping with non-availability measurement of connection for a user equipment, and this treats all of common channels and connection procedures. To inform a network of non-availability of connection and accordingly help parameter optimization for increasing connection availability, the user equipment conducts accessibility measurement upon failure of connection establishment. In order for accessibility measurement, the user equipment performs the following logging:

A time stamp generated by using a relative timer counting the time between failure and reporting is included. The saving time for accessibility measurement is 48 hours.

Reporting the number of random access preambles transmitted is supported.

Indicating whether to reach the maximum power level is included.

Indicating whether contention is sensed during a random access procedure for connection establishment is included.

H(e)NB will now be described.

The mobile communication service may be provided by a person, a specific service provider or a base station that belongs to a group as well as a mobile network service provider. Such a base station is referred to a Home NB (HNB) or a Home eNB (HeNB). Hereinafter, as a general term of the both HNB and HeNB, HeNB will be used. The object of the HeNB is basically to provide the specific service which is available only for the closed subscriber group (CSG). But it may provide service to different users as well as the CSG according to the operation mode configuration of the HeNB.

Figure 12:
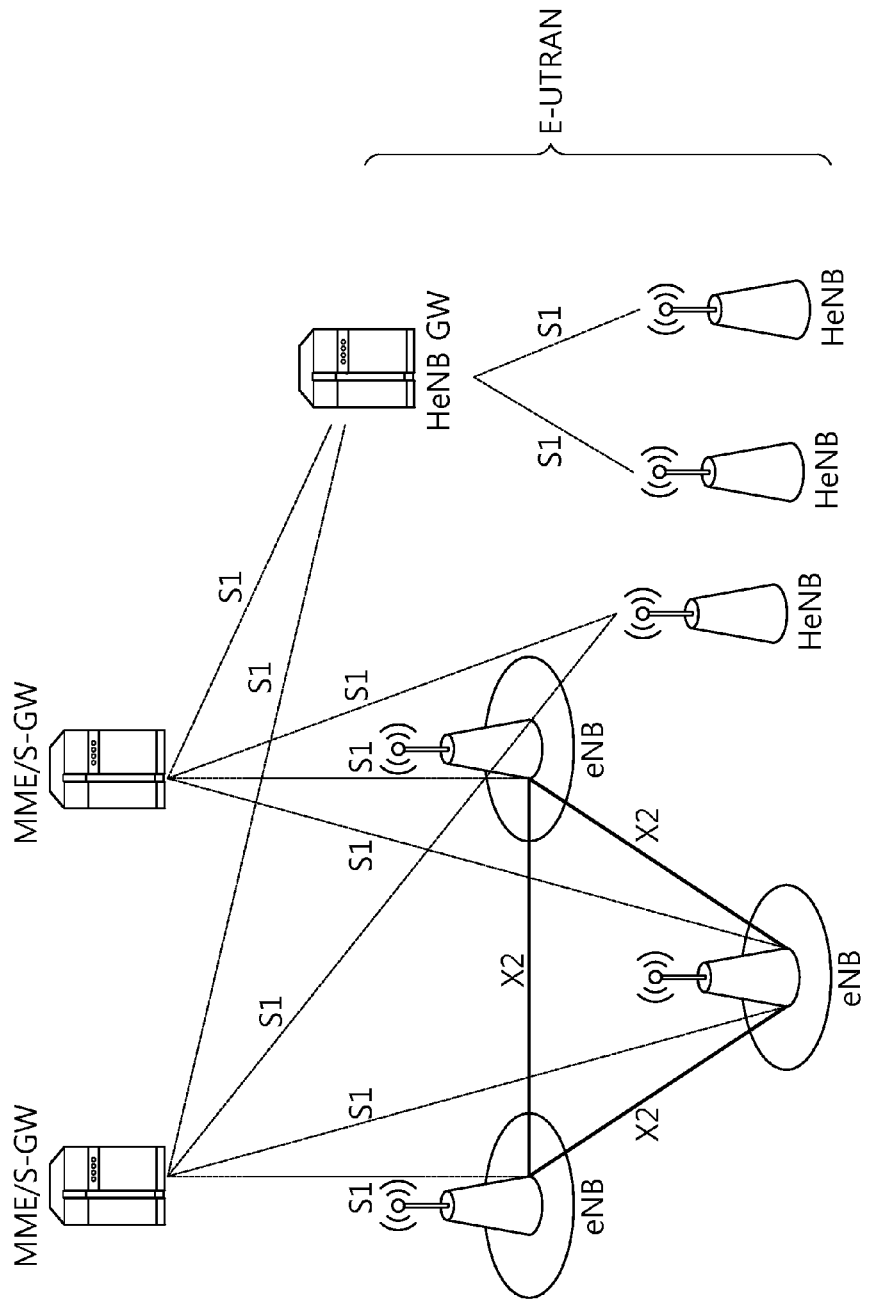
FIG. 12 is a drawing illustrating an example of the HeNB operation in a wireless communication system.

FIG. 12 is a drawing illustrating an example of the HeNB operation in a wireless communication system.

Referring to FIG. 12, a Home eNB gateway (HeNB GW) may be operated to provide service of the above mentioned HeNB. The HeNB is connected to the EPC via the HeNB GW or to the EPC directly. The HeNB GW looks like a general eNB to the MME. Accordingly, the HeNB and the HeNB GW are connected via S1 interface, and the HeNB GW and the EPC are also connected via S1 interface. In addition, in case that the HeNB and the EPC are directly connected, they are connected via S1 interface. The function of the HeNB is mostly the same as that of general eNB.

Generally, the HeNB has a lower wireless transmission output compared to the eNB owned by the mobile network service provider. Accordingly, it is normal that the service coverage provided by the HeNB is smaller than the service coverage provided by the eNB. Due to the characteristics as such, in the aspect of the service area, the cell provided by the HeNB is sometimes classified by a femto cell in comparison with the macro cell provided by the eNB. Meanwhile, in the aspect of the service provided, if the HeNB provides service only for the CSG group, the cell provided by the HeNB is referred to the CSG cell.

Each CSG cell has its own identification number, and the identification number is called the CSG identity (ID). A UE may have the list of the CSG to which it belongs as a member, and the CSG list may be changed by the request of the UE or the command of network. Normally, one HeNB may support one CSG.

By transferring CSG ID of the CSG supported by the HeNB via the system information, the HeNB may let only member UEs of the relevant CGS access. When a UE finds the CSG cell, the UE may check which CSG is supported by the CSG cell by reading the CSG ID included in the system information. The UE that reads the CSG ID regards the cell as an accessible cell only in case that the UE itself is a member of the corresponding CSG cell.

It is not necessary that the HeNB always permits an access only to the CSG UE. According to the component configuration of the HeNB, an access of the UE which is not the CSG member may be permitted. Which UE is permitted to access is changed according to the component configuration of the HeNB, and the component configuration means the configuration of operational mode of the HeNB. The operational modes of the HeNB are classified into three modes according to which UE the service is provided for.

Closed access mode: A mode that provides service only to specific CSG members. The HeNB provides the CSG cell.

Open access mode: A mode that provides service for all without any limitation of the specific CSG member like the general eNB. The HeNB provides the general cell, not the CSG cell.

Hybrid access mode: A mode that may provides the CSG service to the specific CSG member, and provides service to the non-CSG member like the general cell. It is recognized by the CSG member UE as the CSG cell, and recognized by the non-CSG member UE as the general cell. Such cell is called the hybrid cell.

By notifying the UE whether the cell to which the HeNB itself offers service is the general cell or the CGS cell, the HeNB let the UE detect whether they can access the corresponding cell or not. The HeNB which is operated in the closed access mode broadcasts that its own self is the CSG cell via the system information. The HeNB which is operated in the open access mode broadcasts that its own self is not the CSG cell via the system information. As such, the HeNB includes the CSG indicator of 1 bit in the system information which notifies whether the cell to which the HeNB itself. For example, the CSG cell broadcasts with the CSG indicator set to be TRUE. If the cell to which it offer service is not the CSG cell, a method may be used, either which the CSG indicator is set to be FALSE or which the transmission of the CSG indicator is omitted. Since a UE must distinguish the general cell which is provided by the eNB from the CSG cell, the general eNB also transmits the CSG indicator and may also let the UE know that the cell type provided by its own self is the general cell. The general eNB may let the UE know that the cell type provided by its own self is the general cell not by transmitting the CSG indicator. Table 2 represents the parameter relevant to the CSG which is transmitted from the corresponding cell by the cell types. Successively, table 3 represents the sort of UEs that permit access by the cell types.

TABLE 2

|  | CSG cell | General cell |
| --- | --- | --- |
| CSG indicator | Indicating 'CSG cell' | Indicating 'Non-CSG cell' or not transmitted |
| CSG identity | Transmitting supported CSG identity | Not transmitted |

TABLE 3

|  | CSG cell | General cell |
| --- | --- | --- |
| UE not supporting CSG | Inaccessible | Accessible |
| Non-CSG member UE | Inaccessible | Accessible |
| Member CSG UE | Accessible | Accessible |

In some frequency, the CSG cell and the (normal) macro cell may be operated at the same time. Hereinafter, such frequency is called a mixed carrier frequency. Network may reserve specific physical layer cell indicators for the use of the CSG cell in the mixed carrier frequency. The physical layer cell indicator is called a physical cell identity (PCI) in the E-UTRAN system and is called a physical scrambling code (PSC) in the UTRAN. For the convenience of description, the physical layer cell indicator will be represented as the PCI. In the mixed carrier frequency, the CSG cell notifies the information of the PCIs reserved for the use of the CSG in the current frequency via the system information. The UE that receives the information may determine whether the cell is the CSG cell or not from the PCI of the cell, when it finds a certain cell in the corresponding frequency.

The UE that does not support the function related the CSG or does not have the CSG list to which it belongs as a member is not necessary to regard the CSG cell as the selectable cell in the process of cell selection/reselection. In this case, the UE checks only the PCI of the cell, and if the PCI is the PCI reserved as the CSG, it may exclude the corresponding cell in the process of cell selection/reselection. In general, the PCI of a certain cell may be directly acknowledged by the UE in the process of checking the presence of the corresponding cell existed in the physical layer.

As for the UE that has the CGS list to which it belongs, when it wants to know the list of the CSG cells nearby in the mixed carrier frequency, it may know that the corresponding cell is the CSG cell by finding the cell which has the PCI reserved as the use of the CSG instead of checking the CSG indicators of the system information for all cells found in the overall PCI range one by one.

Hereinafter, the method of reselecting the cell related to the CGS cell will be described.

The CSG cell is the cell to support a better service for the UE of the corresponding CSG member. Accordingly, during the UE is camping on the CSG cell, it may be not desirable to reselect the inter-frequency cell in the aspect of the quality of service even though the UE may detect the inter-frequency which has higher frequency priority than that of serving frequency.

While the UE is camping on the CSG, in order to prevent unconditionally reselecting the inter-frequency which has higher frequency priority than that of the serving frequency, the UE assumes that the frequency priority of the corresponding frequency is higher than that of the other frequency in case that the CSG cell of a certain frequency turns out to be the best ranked according to the evaluation standard of cell reselection in the frequency. Likewise, when the UE designates higher frequency priority than the frequency priority that can be designated by the network in a specific frequency by itself, the frequency priority is referred to an implicit highest priority. By this, it may help that the UE remains in the CSG cell with keeping the existing rule of selecting the cell, the UE considers the frequency priority first when the UE reselects the cell. If the UE in the CSG cell reselects the non-CSG cell of the corresponding frequency, the UE withdraws the assumption of the implicit highest priority for the corresponding frequency, and use the frequency priority value transferred by the network in evaluating the cell reselection. In case that the UE detects another CSG cell of best ranked in the frequency which has the same frequency priority while the UE is camping on the CSG cell, it depends on the implementation of the UE whether the UE reselects the CSG cell or remains in the CSG cell which the UE is camping on.

The handover method related to the CSG cell will now be described.

The UE in the state of RRC connection executes the general measurement and mobility process on the basis of the configuration provided by the network. The UE is not requested to support the manual selection of CSG IDs during being in the state of RRC connection. The handover to the HNB/HeNB is supported by the UE and follows the framework of the handover controlled by the network. The handover to the HNB/HeNB has three differences from the general handover process.

1. Proximity Estimation: In case that the UE is able to detect whether the CSG with the CSG ID included in the CGS white list of the UE or a hybrid cell is close through the autonomous search procedure, the UE may provide a proximity indication to the source eNB. The proximity indication may be used as below:

If there is no measurement configuration of the frequency/RAT considered, it may be configured that the source eNB orders the UE to execute measurement and report of the considered frequency/RAT.

The source eNB may determine whether another action related to the handover to the HNB/HeNB is executed on the basis of the proximity indication received (For example, the source eNB may not be configured for the UE to acquire the system information of the HNB/HeNB, if the proximity indication is not received.).

2. PSC/PCI confusion: Since the typical cell size of the HNB/HeNB is much smaller than that of the macro cell, the multiple HNB/HeNB which have the identical PSC/PCI in the coverage of the source eNB may exist. This may result in the condition which is called the PSC/PCI confusion, and this is the case of the source of eNB not determining the proper target cell for the handover from the PSC/PCI included in the measurement report from the UE. The PSC/PCI confusion can be solved by the UE reporting the global cell ID (GCI) of the target HNB/HeNB.

3. Access Control: If the target cell is the hybrid cell, prioritizing the allocated resources may be performed on the basis of the membership status of the UE. The access control may be performed by two processes: First, the UE reports the membership status on the basis of the CSG ID and the CSG white list of the UE which is received from the target cell, and the network discerns the state of report.

The mobility from the eNB/HeNB to the CSG/hybrid cell of the HeNB occurs with being accompanied by the S1 handover process. Hereinafter, the source cell may be either one of the eNB or the HeNB. The process may be applied to all scenarios for which the CSG ID is provided by the UE or by the source eNB.

Figure 13:
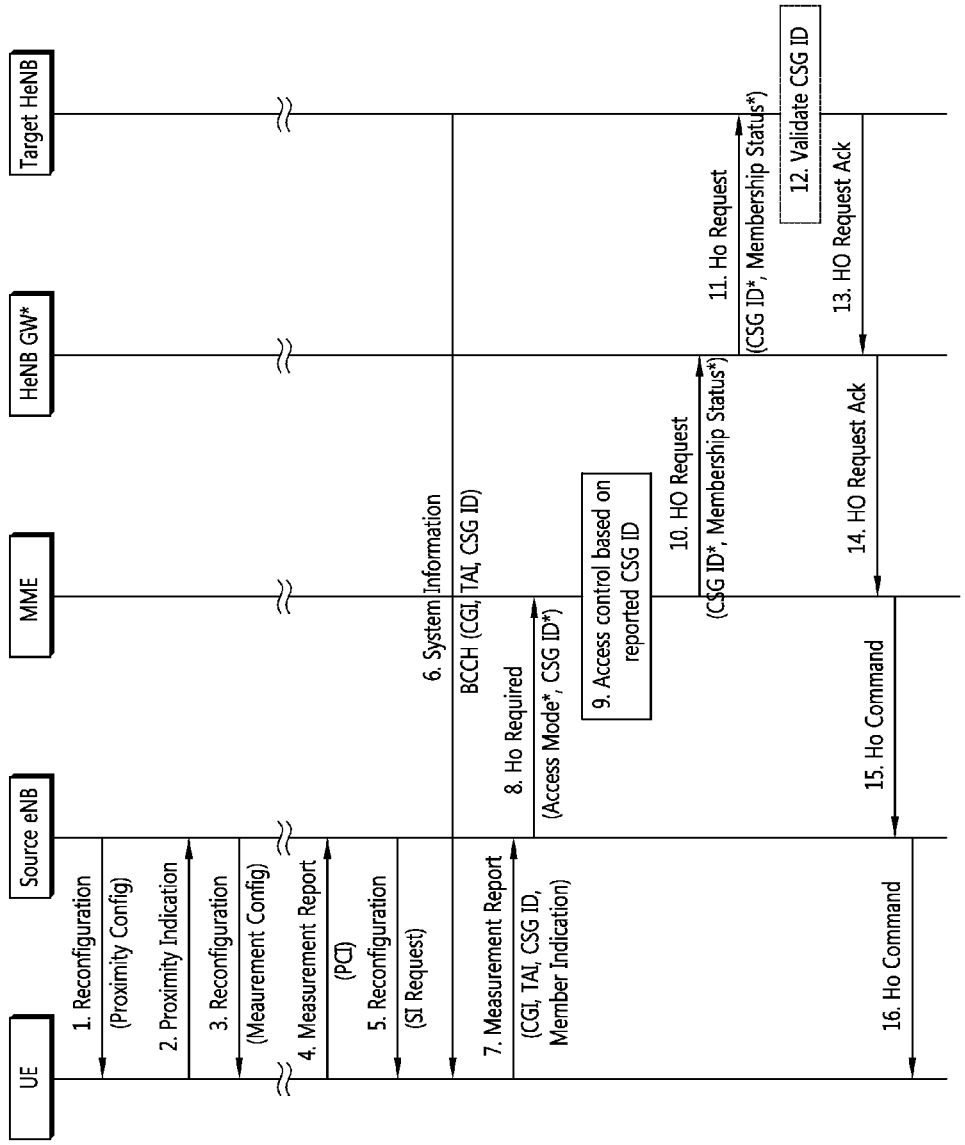
FIG. 13 is a flow chart illustrating the handover process of the CSG cell.

FIG. 13 is a flow chart illustrating the handover process of the CSG cell.

Referring to FIG. 13, the handover process of the CSG cell will be described below.

Step 1. The source eNB configures the proximity indication control to the UE. For this, the source eNB may transmit a reconfiguration message to the UE. The reconfiguration message includes the information for the configuration of the proximity indication.

Step 2. When the UE (on the basis of the autonomous search procedure) detects that the UE is close to the cell which has the CSG ID included in the CSG white list of the UE, the UE transmits "Entering" proximity indication. The proximity indication includes the RAT and frequency of the cell.

Step 3. If there is no measurement configuration for the frequency/RAT considered, the source eNB sets up the proper measurement configuration including the measurement gap on the UE depending on its need the UE may perform the measurement for the RAT and frequency reported. For this, the source eNB transmits a reconfiguration message to the UE. The reconfiguration message may include the information of the configuration for the measurement.

Also, if the UE does not exist in the geographical area where the cells that have the CSG ID included in the CSG white list of the UE are located, the network may use the proximity indication in order to minimize the request for the handover preparation information of the CSG/hybrid cell by avoiding requesting such information.

Step 4. The UE transmits the measurement report that includes the PCI (for example, occurred by the event A3 triggered).

Step 5. The source eNB sets up the UE in order to perform acquiring the system information and reporting a specific PCI.

Step 6. The UE performs acquiring the system information using the autonomous gap, for example, the UE may terminate receiving or transmitting within the range limit defined by [TS 36.133] to acquire the proper system information from the target HeNB.

Step 7. The UE transmits the measurement report that includes (E-) CGI, TAI, CSG ID and "member/non-member" indications.

Step 8. The source eNB includes the target E-CGI and CSG ID in the handover required message which is requested to send via the MME. If the target is the hybrid cell, the cell access mode of the target is included.

Step 9. The MME performs the UE access control onto the CSG cell based on the received CSG ID which is in the handover message requested above and the CSG subscription data stored for the UE. If the access control process fails, the MME terminates the handover process by answering by a handover preparation failure message. In case of the cell access mode, the MME determines the CSG membership status of the UE that handovers to the hybrid cell, and includes it in the handover request message.

Step 10-11. The MME transmits the handover request message that includes the target CSG ID received via the handover message requested above to the target HeNB. If the target is the hybrid cell, the CSG membership status may be included in the handover request message.

Step 12. The target HeNB checks if the CSG ID received via the handover request message matches with the broadcasted CSG ID of the target cell, and allocates the appropriate resource if the process of checking above is done. The priority determination of the UE may be also applied to the case that the above UE is indicated as a member by the state of the CSG membership.

Step 13-14. The target HeNB transmits the handover request acknowledgement message to the MME through the HeNB GW if it is existed.

Step 15. The MME transmits the handover command message to the source eNB.

Step 16. The source eNB transmits the handover command (the RRC connection reconfiguration message including the mobility control information) to the UE.

Steps 1 to 9, 15 and 16 may be applied to an inter-RAT mobility from LTE to the HNB.

After transmitting the proximity indication "Enter" (step 2), if the UE determines that the cell having the CSG ID included in the CSG white list of the UE is not near any more, the UE transmits the proximity indication "leaving" to the source eNB above. After receiving the indication, the source eNB may reconfigure the UE to terminate the measurement of the RAT and frequency reported.

According to the process above, in case that the UE has never visited to the HeNB, for example, the UE visits to the hybrid cell for the first time, steps 2 and 3 may not be performed.

The PCI confusion may be solved through steps 5 to 7. The source eNB acquires the system information and may request to report any PCI, whatever it is, which is not limited to the PSC/PCI of the CSG or hybrid cell.

The parameter scaling related to the mobility influences on the mobility determination of the UE according to the state of the UE mobility will be described below. In case that the UE fast moves through cells, it may fall into the disable state of service since the mobility to neighboring cells are not timely performed. Accordingly, the mobility performance is improved by optimizing the value of the parameter related to the mobility with the speed of the UE according to the speed of the UE. As described above, by determining the mobility status (performing the MSE) and scaling the parameter related to the mobility determination according to the mobility status of the UE determined by the UE, the mobility of the UE may be more effectively supported.

The mobility state of the UE may be divided to the high mobility state, the medium mobility state and the normal mobility state. Each mobility state may be determined on the basis of the number of the handover performed by the UE and/or the number of the cell reselection performed.

The UE in the state of RRC_IDLE performs the cell reselection if the cell reselection criteria are satisfied. If the number of the cell reselection performed by the UE for the specific time interval ($T_{CRmax}$) exceeds the first threshold value ($N_{CR\_H}$), the mobility state of the UE satisfies the condition of the high mobility state. Meanwhile, if the number of the cell reselection performed by the UE for the specific time interval ($T_{CRmax}$) exceeds the second threshold value ($N_{CR\_M}$) and does not exceed the first threshold value ($N_{CR\_H}$), the mobility state of the UE satisfies the condition of the medium mobility state. If the number of the cell reselection performed by the UE for the specific time interval ($T_{CRmax}$) does not exceed the second threshold value ($N_{CR\_M}$), the mobility state of the UE satisfies the condition of the normal mobility state. However, in case that the UE continually performs the cell reselection between the two identical cells, it may not be counted as the number of the cell reselection performed.

If a specific condition is satisfied when measuring the neighboring cell, the UE in the RRC_CONNECTED state reports the result of the measurement and performs the handover. If the number of the handover performed by the UE for the specific time interval exceeds the first threshold value, the mobility state of the UE satisfies the condition of the high mobility state. Meanwhile, if the number of the handover performed by the UE for the specific time interval exceeds the second threshold value and does not exceed the first threshold value, the mobility state of the UE satisfies the condition of the medium mobility state. If the number of the handover performed by the UE for the specific time interval does not exceed the second threshold value, the mobility state of the UE satisfies the condition of the normal mobility state.

If the UE in the RRC_IDLE or RRC_CONNECTED state detects that the above described condition of the mobility state is satisfied, it may enter into the corresponding mobility state. Entering into the corresponding mobility state might be the determination of the UE that its mobility state is the corresponding mobility state. However, if it is determined that both condition of the high mobility state and of the normal mobility state are not satisfied for a specific time interval, the UE may enter into the normal mobility state.

The UE which detects the mobility state may perform scaling the mobility parameter on the basis of the mobility state. The UE in the RRC_IDLE state may perform scaling the Tselection parameter, and the UE in the RRC_CONNECTED state may perform scaling the TimeToTrigger parameter. The scaling may be implemented by multiplying a specific scaling factor to the Tselection parameter or the TimeToTrigger parameter. The scaling factor may be different according to the mobility state of the UE. For example, the scaling factor in the high mobility state may be smaller than the scaling factor in the medium mobility state. The scaling may not be performed in the medium mobility state. The scaling may be performed by the network or the cell as well as by the UE, and the information for this may be given to the UE.

First, the scaling applied to the Tselection parameter used for the reselection of a cell by the UE in the RRC_IDLE state will be described in detail.

1) In case of the normal mobility state (neither the medium nor the high mobility state), scaling Tselection is not performed.

2) In case of the high mobility state

Scaling is performed by multiplying the scaling factor sf-high to the $Tselection_{EUTRA}$ in the E-UTRAN.

Scaling is performed by multiplying the scaling factor sf-high to the $Tselection_{UTRA}$ in the UTRAN.

Scaling is performed by multiplying the scaling factor sf-high to the $Tselection_{GERA}$ in the GERAN.

Scaling is performed by multiplying the scaling factor sf-high to the $Tselection_{CDMA\_HPRD}$ in the CDMA2000 HRPD.

Scaling is performed by multiplying the scaling factor sf-high to the $Tselection_{CDMA\_1 \times RTT}$ in the CDMA2000 1×RTT.

3) In case of the medium mobility state

Scaling is performed by multiplying the scaling factor sf-medium to the $Tselection_{EUTRA}$ in the E-UTRAN.

Scaling is performed by multiplying the scaling factor sf-medium to the $Tselection_{UTRA}$ in the UTRAN.

Scaling is performed by multiplying the scaling factor sf-medium to the $Tselection_{GERA}$ in the GERAN.

Scaling is performed by multiplying the scaling factor sf-medium to the $Tselection_{CDMA\_HPRD}$ in the CDMA2000 HRPD.

Scaling is performed by multiplying the scaling factor sf-medium to the $Tselection_{CDMA\_1 \times RTT}$ in the CDMA2000 1×RTT.

The information parameter (e.g., scaling factor) needed for scaling the Tselection parameter by the UE in the RRC_IDLE state may be provided for the UE with being included in the system information which is broadcasted. The UE may perform scaling if the information parameter for scaling is included in the system information.

Next, the scaling applied to the TimeToTrigger parameter used for reporting the measurement and/or the handover by the UE in the RRC_CONNECTED state will be described in detail.

1) In case of the normal mobility state (neither the medium nor the high mobility state), scaling the TimeToTrigger is not performed.

2) In case of the high mobility state

Scaling is performed by multiplying the scaling factor sf-high to the TimeToTrigger.

3) In case of the medium mobility state

Scaling is performed by multiplying the scaling factor sf-medium to the TimeToTrigger.

As described above, more proper mobility performance may be executed by applying a different mobility parameter according to the mobility state of the UE. For example, in case that the UE moves fast, by performing scaling according to the high mobility state through the evaluation of the mobility via the MSE, the UE may perform the mobility faster based on the mobility parameter which becomes smaller.

The evaluation of the mobility state and the scaling of the mobility parameter may result in a problem in the aspect of performing the mobility due to the actual move of the UE and performing the inter-frequency mobility which is not related to the actual move of the UE. This will be described below.

(1) The problem in the aspect of the actual move of the UE.

As the mobile communication technology develops, the number of communication service subscribers increases, and a very large number of UEs may exist in one macro cell coverage. In this case, the UE is provided or is expected to be offered with service by the macro cell, the traffic of the macro cell may be overloaded. The communication service provider may want to offload the traffic of the macro cell in order to provide more effective and better service for the subscriber. For this, by installing relatively small coverage cells in a specific location within a macro cell which has wide coverage, the communication system may be implemented which is to provide service for the UEs in the small cell coverage from a small cell instead of the macro cell. Such communication system may be called the heterogeneous network.

In the heterogeneous network, the femto cell and/or the pico cell whose coverage is much smaller may coexist in the macro cell coverage. The UE counts the number of moves whenever it moves into the pico cell and/or the femto cell by the cell reselection or the handover while it moving. Hereinafter, the number of moves counted by the UE will be referred to the mobility counter. The mobility counter is the number of the cell reselection performed by the UE in the RRC_IDLE state and/or the number of the handover performed by the UE in the RRC_CONNECTED state, which is the basis of determining the mobility state by evaluating the mobility state.

Meanwhile, since the coverage of the femto cell and/or the pico cell in the heterogeneous network is relatively much smaller than that of the macro cell, the UE may perform mobility more frequently even in case that the UE actually does not move with fast speed. In this case, the UE may determine that the UE itself is in the high mobility state or in the medium mobility state by the MSE. That is because the UE constantly increases the mobility count even in case of the UE moving into the femto cell and/or the pico cell whose coverage is small. The mobility state evaluating as above corresponds to the result in which the actual mobility state of the UE is not properly reflected.

(2) The problem in the aspect of the inter-frequency mobility.

The reason why the UE moves into the cell whose frequency is different from that of the currently serving cell is due to the lack of the coverage of the currently serving cell frequency, that is, due to the UE getting out of the coverage serviced according to the current frequency. Otherwise, it may be because that it is configured by the network that the UE moves to different frequency according to the network operation policy or for the load balancing, even if the UE exists in the coverage of the corresponding frequency.

What the UE gets out of the coverage of the current frequency and moves into cells with other frequency may be assumed that the mobility is done by the physical moves of the actual UE. In this case, it may be determined that the mobility state evaluated by the MSE properly reflects the mobility of the actual UE.

However, in case that the UE moves into the cell of different frequency although it is not lack of the coverage of the current frequency, it is highly probable that the mobility is not performed by actual physical movement of the UE. This is because the inter-frequency mobility may be performed according to the priority assigned to the cell frequency rather than the quality of service provided for the location of the UE/the UE. In this case, it may be determined that the mobility state evaluated according to the MSE is higher than the actual mobility state since the mobility counter which corresponds to the number of mobility performed according to the mobility performance is increased without actual movement of the UE.

As an example of the inter-frequency mobility, the autonomous top priority configuration of the member CSG cell or the multimedia broadcast multicast service (MBMS) of the UE may be also related to the MSE. When the UE finds the CSG cell to which it belongs as a member, the UE sets up the priority of cell reselection to be top priority with respect to the frequency of the corresponding CSG cell. That is, the UE sets up the frequency of the corresponding CSG cell to be higher than other frequency in the cell reselection priority list received from the network. Accordingly, the priority of the frequency in which the CSG cell exists is set up as the top priority value which is different from the cell reselection priority received from the network, and the priority of the other frequencies remains as the existing priority.

Also, in case that the UE prefers receiving the MBMS service, and in case that the UE is located in the region where the MBMS service is provided, the UE configures the cell reselection priority of the frequency in which the MBMS service is provided as to the top priority. That is, in the cell reselection priority list received from the wireless network, the UE sets up the priority of the frequency in which the MBMS service is provided to be higher than the priority of the other frequency. Accordingly, the priority of the frequency related to the MBMS service is set up to be the top priority value which is different from the cell reselection priority received from the network, and the priority of the other frequencies remains as the existing priority.

As described above, regarding the inter-frequency mobility to the frequency in which the top priority is assigned by the UE, the mobility state evaluated according to the MSE may be determined to be higher than the actual mobility state by increasing the mobility counter without actual moves.

Hereinafter, this will be described in more detail referring to FIG. 14.

Figure 14:
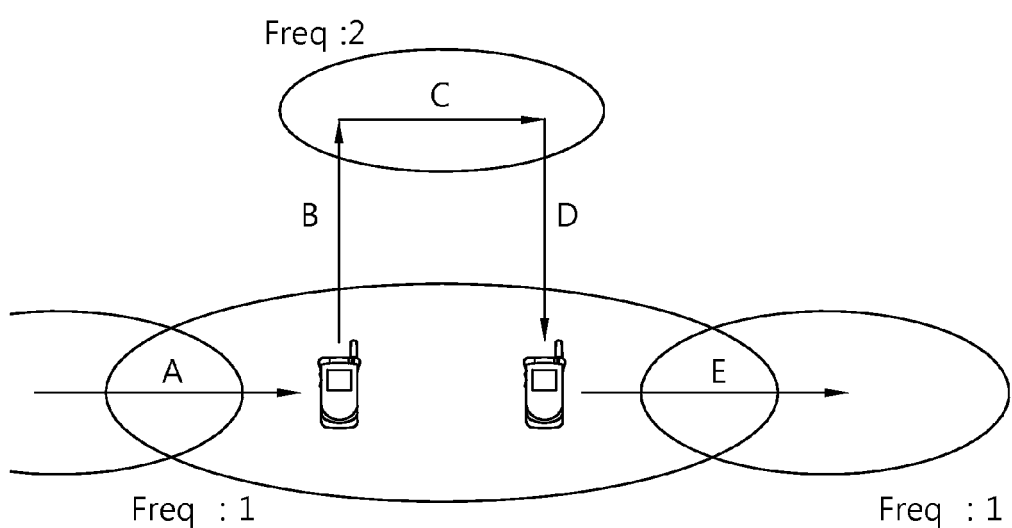
FIG. 14 is a drawing illustrating an example of the mobility performed by the UE in the wireless communication system.

FIG. 14 is a drawing illustrating an example of the mobility performed by the UE in the wireless communication system.

Referring to FIG. 14, the paths A, C and E correspond to the actual moves of the UE. Among these, the paths A and E where the cell reselection is performed or the handover is performed are the paths of the mobility performed by the UE, which become the object of the mobility counting.

Although the paths B and D are not what the UE actually moves in, but what the inter-frequency cell reselection or the handover is performed in. The paths B and D are the paths of the mobility performed by the UE, which become the object of the mobility counting.

According to the existing MSE, among the steps A to E, the mobility counter is updated after the steps A, B, D and E. However, since the step B and D are objects of the mobility counting, although it does not correspond to the actual moves of the UE, the step B and D may be the factor which results in an error when the UE detects the actual mobility state by the UE.

In this case, the mobility counter of the UE may be determined as the state of being unnecessarily high, which may result in the problem that the mobility parameter such as Tselection or TimeToTrigger is improperly scaled.

In order to solve the problem that may be occurred by the MSE described above, the network may provide the MSE control information that the UE may use for controlling the MSE. The MSE control information may be broadcasted from the network or directly signaled to a specific UE.

The MSE control information may include the counting threshold value and/or the prohibit timer.

When the UE updating the mobility counter value through performing the mobility, the counting threshold value means the maximum value of the mobility counter value that may be increased during the prohibit timer is driving. In case that the counting threshold value is effective, the UE is not able to update the mobility counter as to the value exceeding the counting threshold value even if the UE performs the mobility. The counting threshold value may be included in the MSE control information with being configured as a specific value.

However, in case that the counting threshold value is not included in the MSE control information, the UE may assume that the counting threshold value is set to 1.

The prohibit timer value is the value to be set in the prohibit timer that indicates the effective duration time of the counting threshold value. When receiving the MSE control information, the UE sets up the prohibit timer as to the prohibit timer value, and start the prohibit timer. The UE does not terminate the prohibit timer even in case of performing the mobility to another cell. Even in case of performing the mobility to another cell which is signaling the different prohibit timer value, the UE does not terminate/discard the prohibit timer which is currently operating. Instead, the UE sets up the prohibit timer to the newly signaled prohibit timer value after the existing timer is terminated, and let it start.

In case that the prohibit timer is in operating, that is, the counting threshold is effective, the UE does not update the mobility counter to the value exceeding the counting threshold value even if the UE performs the mobility. Even if the UE performs the mobility as many as the number of exceeding the counting threshold value, the final mobility counter value is set to the counting threshold value.

Figure 15:
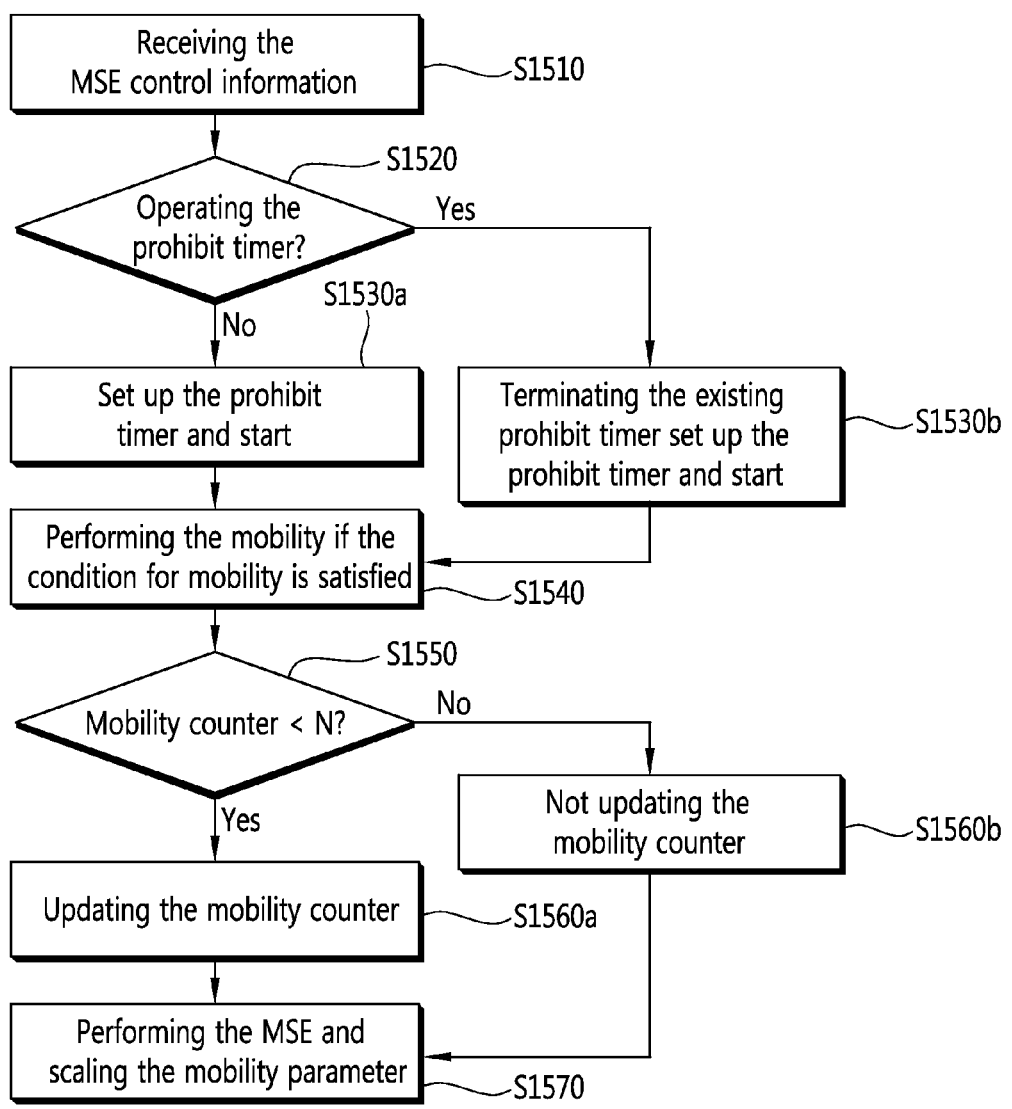
FIG. 15 is a flow chart illustrating the UE how to perform the MSE according to an embodiment of the present invention.

FIG. 15 is a flow chart illustrating the UE how to perform the MSE according to an embodiment of the present invention.

Referring to FIG. 15, the UE receives the MSE control information from the network (step, S1510). The MSE control information may include the prohibit timer value and/or the counting threshold value. If the counting threshold value is not included in the MSE control information, the UE may assume that the counting threshold value is 1.

The UE detects whether the prohibit timer is in operating (step, S1520).

If the prohibit timer is not in operating, the UE set up the prohibit timer to the prohibit timer value included in the MSE control information received, and let it start (step, S1530a).

If the prohibit timer is in operating, the UE set up the prohibit timer to the prohibit timer value included in the MSE control information received above, and let it be started after the prohibit timer is terminated (step, S1530b).

The UE performs the mobility if the mobility condition is satisfied (S1540). If the cell reselection condition is satisfied, the UE in the RRC idle state performs the cell reselection. The UE in the RRC connected state performs the handover if the handover condition is satisfied.

The UE determines whether the mobility counter is updated or not after the mobility performed. The decision of updating includes comparing the current mobility counter value with the counting threshold value (N) received.

The UE updates the mobility counter if the mobility counter value is smaller than the counting threshold value (step, S1560a). Updating the mobility counter is to set up the value increased by 1 from the current mobility counter value as the new mobility counter value.

If the mobility counter value is not smaller than the counting threshold value, the UE does not update the mobility counter (step, S1560b). That is, the UE may not update the mobility counter value even though the mobility has been performed.

The UE performs the MSE on the basis of the mobility counter value and scaling the mobility parameter (step, S1570).

Meanwhile, a plurality of prohibit timer values may be included in the MSE information. Each of the prohibit timer values may be related to the mobility state of the UE. For example, three prohibit timer value may be provided to the three mobility state (the high mobility, the medium mobility and the normal mobility). In this case, the UE may set up the prohibit timer by selecting a proper prohibit timer value according to its current mobility state. Accordingly, only one prohibit timer may be operated for one UE for a moment.

In the situation that the prohibit timer value is provided for the UE according to the mobility state of the UE as above, in case that the mobility state of the UE is changed while the prohibit timer is in operating, the UE sets up the prohibit timer value to the prohibit timer value that corresponds to the mobility state changed, then let the prohibit timer which is set up start.

Meanwhile, the scaling factor values for scaling the prohibit timer value according to the change of the mobility state of the UE may be included in the MSE information. For example, if the prohibit timer value which is applied in the general mobility state of the UE is referred to as the basic prohibit timer, the prohibit timer scaling factor for use of the medium mobility which is scaling the basic prohibit timer may exist in case of the medium mobility state, and the prohibit time scaling factor for use of the high mobility which is scaling the basic prohibit timer may exist in case of the high mobility state. The above scaling factors may be implemented that the prohibit timer value is to be lowered when the mobility state of the UE becomes high, and is to be increased when the mobility state of the UE becomes low.

In the situation that the scaling factor that can be scaling the prohibit timer is provided for the UE according to the change of mobility state of the UE as above, if the mobility state of the UE is changed while the prohibit timer is in operating, the UE sets up the prohibit timer value as to that of being scaled after selecting the scaling factor which is suitable for the change of the mobility and scaling it. And then the UE may let the prohibit timer which is set up start.

According to the embodiment of the present invention described with referring to the drawings, more strengthen MSE may be provided since the MSE control information is provided to the UE. According to the embodiment of the present invention, in the heterogeneous network where the macro cells and other small cells coexist, the improper mobility counting due to the mobility performance which is not related to the actual move of the UE may be prohibited. According to an exemplary embodiment of the present invention, in the wireless communication system in which inter-frequency mobility is frequently caused, the improper mobility counting due to the mobility performance which is not related to the actual move of the UE may be prohibited. Through this, the mobility state of the UE which is estimated by the MSE executed by the UE may more suitably reflect the actual mobility of the UE. On the basis of this, the UE may suitably execute mobility according to actual network surroundings and the state of its mobility.

Figure 16:
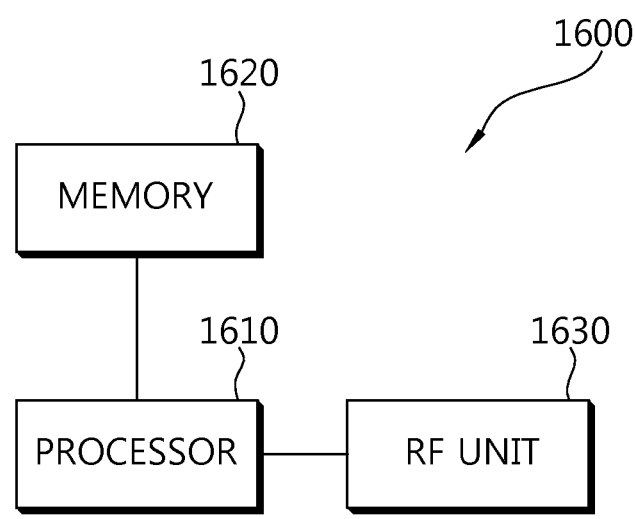
FIG. 16 is a block diagram that illustrates a wireless apparatus in which the embodiment of the present invention can be implemented.

FIG. 16 is a block diagram that illustrates a wireless apparatus in which the embodiment of the present invention can be implemented. The apparatus may implement the operation of the UE according to the embodiment described with referring to FIG. 15.

The wireless apparatus 1600 includes a processor 1610, a memory 1620 and a radio frequency (RF) unit 1630.

The processor 1610 implements the suggested function, process and/or method. The processor 1610 may be configured to receive the MSE control information and to determine whether the mobility counter is updated. The processor 1610 may be configured to determine whether the prohibit timer is operated on the basis of the MSE control information. The processor 1610 is configured to perform the MSE and to perform scaling the mobility parameter according the mobility state estimated. The embodiment as described above with referring to FIG. 15 may be implemented by the processor 1610 and the memory 1620.

The RF unit 1630 transmits and receives the wireless signal with being connected to the processor 1610.

The processor 1610 may include an application specific integrated circuit (ASIC), other chipsets, a logic circuit and/or a data processing device. The memory 1620 may include a read-only memory (ROM), a random access memory (RAM), a flash memory, a memory card, a storing medium and/or other storing device. When an embodiment is implemented by software, the above-described technique may be implemented by the modules (a processing, a function, and the like) that perform the aforementioned functions. The modules are stored in the memory 1620, and may be executed by the processor 1610. The memory 1620 may be included in or outside the processor 1610, and may be functionally connected with the processor 1610 by various known means.

Although the methods are described based on the flow charts as a series of steps or blocks in the aforementioned exemplary system, the present invention is not limited to the order of the steps. A certain step may take place differently from the aforementioned steps, with different order or at the same time. In addition, it may be understood to one of ordinary skill in the art that the steps shown in the flow chart are not exclusive, but rather may include other steps, and one or more of the steps may be deleted without influencing the scope of the present invention.

What is claimed is:

1. A method for supporting mobility performance of a user equipment in a wireless communication system, the method comprising:
   receiving mobility state estimation (MSE) control information including information for the MSE from a network;
   performing mobility if a condition for the mobility is satisfied;
   updating a mobility counter on the basis of the MSE control information;
   estimating a mobility state of the user equipment on the basis of the updated mobility counter; and
   scaling a mobility parameter on the basis of the estimated mobility state,
   wherein the MSE control information includes a prohibit timer value, which indicates a counting threshold value to limit the value of the mobility counter, and duration time in which the counting threshold value is effective,
   and wherein the prohibit timer is started with the prohibit timer value included in the MSE control information.

2. The method of claim 1, wherein updating the mobility counter includes: checking whether the prohibit timer is terminated;
   determining whether to perform the update of the mobility counter by comparing the mobility counter and the counting threshold value if the prohibit timer is running;
   and increasing the mobility counter by 1, if it is determined that the update of the mobility counter should be performed.

3. The method of claim 2, wherein determining whether to perform the update of the mobility counter includes determining to update the mobility counter, if the value of the mobility counter is less than the counting threshold value.

4. The method of claim 3, wherein determining whether to perform the update of the mobility counter includes determining not to update the mobility counter, if the value of the mobility counter is equal to or greater than the counting threshold value.

5. The method of claim 1, wherein staring up the prohibit timer includes: starting the prohibit timer with the prohibit timer value after the prohibit timer is terminated, if the prohibit timer is currently running.

6. A wireless device operating in a wireless communication system, the wireless device comprising:
  a radio frequency (RF) unit to transmit or receive a wireless communication signal, and
  a processor functionally connected to the RF unit,
  wherein the processor is configured to perform the operations of:
    receiving mobility station estimation (MSE) control information including information for the MSE from a network;
    performing mobility if the condition for the mobility is satisfied;
    updating a mobility counter on the basis of the MSE control information;
    estimating a mobility state of the user equipment on the bases of the updated mobility counter; and
    scaling a mobility parameter on the basis of the estimated mobility state,
  wherein the MSE control information includes a counting threshold value to limit the value of the mobility counter and a prohibit timer value to indicate a duration time in which the counting threshold value is effective, and
  wherein the prohibit timer is started with the prohibit timer value included in the MSE control information.

7. The method of claim 6, wherein updating the mobility counter includes: checking whether the prohibit timer is terminated; determining whether to perform the update of the mobility counter by comparing the mobility counter and the counting threshold value if the prohibit timer is running; and increasing the mobility counter by 1, if it is determined that the update of the mobility counter should be performed.

8. The method of claim 7, wherein determining whether to perform the update of the mobility counter includes determining to update the mobility counter, if the value of the mobility counter is less than the counting threshold value.

9. The method of claim 8, wherein determining whether to perform the update of the mobility counter includes determining not to update the mobility counter, if the value of the mobility counter is equal to or greater than the counting threshold value.

10. The method of claim 6, wherein staring up the prohibit timer includes: starting the prohibit timer with the prohibit timer value after the prohibit timer is terminated, if the prohibit timer is currently running.

* * * * *